United States Patent
Casebolt et al.

(10) Patent No.: US 10,470,058 B2
(45) Date of Patent: Nov. 5, 2019

(54) SINGLE RADIO SERVING MULTIPLE WIRELESS LINKS

(71) Applicant: Microsoft Technology Licensing, LLC, Redmond, WA (US)

(72) Inventors: Mark William Casebolt, Seattle, WA (US); Stanley William Adermann, Redmond, WA (US); Ranveer Chandra, Kirkland, WA (US); Amy Kumar, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/149,109

(22) Filed: May 7, 2016

(65) Prior Publication Data

US 2017/0325102 A1 Nov. 9, 2017

(51) Int. Cl.
*H04W 24/02* (2009.01)
*H04H 20/38* (2008.01)
(Continued)

(52) U.S. Cl.
CPC ............ *H04W 24/02* (2013.01); *H04H 20/38* (2013.01); *H04J 1/045* (2013.01); *H04J 3/1694* (2013.01);
(Continued)

(58) Field of Classification Search
CPC ................................................. H04W 72/0446
See application file for complete search history.

(56) References Cited

U.S. PATENT DOCUMENTS 6,529,488 B1  3/2003  Urs et al.
8,165,044 B2  4/2012  Mahajan et al.
(Continued)

FOREIGN PATENT DOCUMENTS

CN  103529793 A  1/2014
EP  1119137 A1   7/2001
(Continued)

OTHER PUBLICATIONS

So, et al., "Multi-Channel MAC for Ad Hoc Networks: Handling Multi-Channel Hidden Terminals Using a Single Transceiver Networks", In Proceedings of the Fifth ACM International Symposium on Mobile Ad Hoc Networking and Computing, May 24, 2004, pp. 222-233.
(Continued)

*Primary Examiner* — Jeffrey M Rutkowski
*Assistant Examiner* — Chae S Lee
(74) *Attorney, Agent, or Firm* — Alleman Hall Creasman & Tuttle LLP

(57) ABSTRACT

A computing device (such as a computer gaming console) uses only a single radio to concurrently communicate with a wireless network access point and wireless client devices such as game controllers or peripherals. To establish and maintain both a high-throughput link with the access point, and a low-latency link with the client device(s), the single Wi-Fi radio of the computing device is configured to periodically switch between a channel used for the high-throughput link and a different channel that is used for the low-latency link—thus implementing a combination of frequency division multiplexing (FDM) and time division multiplexing (TDM). The console may use aspects of the Wi-Fi protocol standard to ensure that periodically switching its single radio between the two channels is accom- (Continued)

plished while maintaining reliable communication on both channels.

18 Claims, 23 Drawing Sheets

(51) Int. Cl.
| | | |
|---|---|---|
| *H04J 1/04* | (2006.01) | |
| *H04J 3/16* | (2006.01) | |
| *H04L 29/12* | (2006.01) | |
| *H04W 40/00* | (2009.01) | |
| *H04W 72/12* | (2009.01) | |
| *H04W 84/12* | (2009.01) | |
| *H04W 88/08* | (2009.01) | |

(52) U.S. Cl.
CPC ....... *H04L 61/6022* (2013.01); *H04W 40/005* (2013.01); *H04W 72/1242* (2013.01); *H04W 72/1278* (2013.01); *H04W 72/1215* (2013.01); *H04W 84/12* (2013.01); *H04W 88/08* (2013.01)

(56) References Cited

U.S. PATENT DOCUMENTS

| | | | |
|---|---|---|---|
| 8,289,988 B2 | 10/2012 | Lu et al. | |
| 8,619,808 B2 | 12/2013 | Chu et al. | |
| 8,879,996 B2 | 11/2014 | Kenney et al. | |
| 8,923,225 B2 | 12/2014 | Sydor et al. | |
| 9,049,611 B2 | 6/2015 | Negus et al. | |
| 9,185,648 B2 | 11/2015 | Miryala et al. | |
| 9,197,393 B2 | 11/2015 | Chen et al. | |
| 2004/0242159 A1 | 12/2004 | Calderon et al. | |
| 2005/0020299 A1 | 1/2005 | Malone et al. | |
| 2006/0142047 A1 | 6/2006 | Russo et al. | |
| 2008/0123610 A1 | 5/2008 | Desai et al. | |
| 2008/0311844 A1 | 12/2008 | Eidenschink | |
| 2009/0175369 A1 | 7/2009 | Atarashi et al. | |
| 2010/0232400 A1 | 9/2010 | Patil et al. | |
| 2011/0268051 A1 | 11/2011 | Tsao et al. | |
| 2012/0100803 A1 | 4/2012 | Suumaki et al. | |
| 2012/0155284 A1 | 6/2012 | Shaffer et al. | |
| 2012/0243474 A1 | 9/2012 | Iyer et al. | |
| 2012/0307806 A1* | 12/2012 | Agarwal | H04W 72/1252 370/336 |
| 2013/0315141 A1 | 11/2013 | Homchaudhuri et al. | |
| 2014/0044014 A1 | 2/2014 | Kanigicherla et al. | |
| 2014/0044106 A1* | 2/2014 | Bhagwat | H04W 72/1215 370/336 |
| 2014/0153557 A1 | 6/2014 | Kim | |
| 2014/0242984 A1 | 8/2014 | Mujtaba et al. | |
| 2014/0369268 A1 | 12/2014 | Huang et al. | |
| 2015/0103680 A1* | 4/2015 | Anand | H04W 72/1231 370/252 |
| 2015/0163828 A1* | 6/2015 | Vandwalle | H04W 52/383 370/330 |
| 2015/0245387 A1 | 8/2015 | Park et al. | |
| 2015/0319235 A1 | 11/2015 | Liu et al. | |
| 2016/0095110 A1 | 3/2016 | Li et al. | |
| 2016/0295624 A1* | 10/2016 | Novlan | H04W 76/14 |
| 2016/0381525 A1 | 12/2016 | Trainin et al. | |
| 2017/0013539 A1* | 1/2017 | Lepp | H04W 52/0229 |
| 2017/0325103 A1 | 11/2017 | Casebolt et al. | |
| 2018/0139699 A1 | 5/2018 | Choi et al. | |

FOREIGN PATENT DOCUMENTS

| | | |
|---|---|---|
| EP | 1703675 A1 | 9/2006 |
| EP | 2468058 A1 | 6/2012 |
| WO | 2015030992 A1 | 3/2015 |

OTHER PUBLICATIONS

Vedantham, et al., "Component Based Channel Assignment in Single Radio, Multi-channel Ad Hoc Networks", In Proceedings of the 12th annual international conference on Mobile computing and networking, Sep. 23, 2006, pp. 378-389.

Aryafar, et al., "Distance-1 Constrained Channel Assignment in Single Radio Wireless Mesh Networks", In Proceedings of the IEEE 27th Conference on Computer Communications, Apr. 13, 2008, 45 pages.

Ekbatanifard, et al., "FastForward: High-Throughput Dual-Radio Streaming", In Proceedings of IEEE 10th International Conference on Mobile Ad-Hoc and Sensor Systems, Oct. 14, 2013, 5 pages.

"International Search Report and Written Opinion Issued in PCT Application No. PCT/US2017/029998", dated Aug. 3, 2017, 13 Pages.

"Device.Network.WLAN.SupportConnectionToAP", Retrieved from : https://msdn.microsoft.com/en us/library/windows/hardware/dn932693%28v=vs.85%29.aspx, Retrieved on: Jan. 6, 2016, 12 Pages.

"Final Office Action Issued in U.S. Appl. No. 15/149,111", dated Apr. 23, 2018, 18 Pages.

"Non Final Office Action Issued in U.S. Appl. No. 15/149,111", dated Sep. 22, 2017, 17 Pages.

Moyer, Bryon, "Single-Radio Zigbee and Thread", Retrieved from : http://www.eejournal.com/blog/single-radio-zigbee-and-thread/, Sep. 22, 2015, 4 pages.

"International Search Report and Written Opinion Issued in PCT Application No. PCT/US2017/029999", dated Sep. 27, 2017, 19 Pages.

"Non Final Office Action Issued in U.S. Appl. No. 15/149,111", dated Mar. 15, 2019, 16 Pages.

* cited by examiner

SINGLE RADIO SERVING MULTIPLE WIRELESS LINKS

RELATED APPLICATIONS

This application is related to the following U.S. applications filed on or about the same day as the present application: Ser. No. 15/149,111, entitled "SINGLE RADIO SWITCHING BETWEEN MULTIPLE WIRELESS LINKS", filed on or about the same day as the present application, the contents of which are incorporated herein by reference in its entirety for all purposes.

BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" or "last meter" problem. Another advantage is mobility. Wireless communication devices, such as cell phones, printers, and accessories (e.g., keyboards, mice, remote controls, video game controller) are not tied by wires to a fixed location.

To facilitate wireless communications, various organizations and industry groups have promulgated a number of wireless standards. These include the IEEE 802.11 (Wi-Fi) standards, and Wi-Fi Direct (WFD). All of these standards may include specifications for various aspects of wireless communication with a network. These aspects include processes for registering on the network, carrier modulation, frequency bands of operation, and message formats.

SUMMARY

Examples discussed herein relate to configuring a device with a single wireless interface radio to establish and maintain, at the same time, both a high-throughput (e.g., Wi-Fi) connection and a low-latency (i.e., latency optimized) connection. A wireless interface radio is configured to communicate with an access node (e.g., Wi-Fi router) using a first frequency band and a first series of time allocations. The wireless interface radio is also configured to communicate with at least one client device (e.g., game controller) using a second frequency band and a second series of time allocations. The first series of time allocations and the second series of time allocations are non-overlapping. Thus, the communication by the wireless interface radio is both frequency division multiplexed (FDM) and time division multiplexed (TDM). Information is sent to at least one client device via the second frequency band. This information is to be used by at least one client device to select a time to transmit using the second frequency band. Based on a transmission received via the wireless interface radio, a first duration of a first time allocation of at least one of the first series of time allocations and the second series of time allocations is altered. This allows the wireless interface radio to extend (or shorten) the period it is listening on a particular frequency band in order to allow the transmission to complete.

In an example, a high-throughput link is configured that uses a wireless interface radio to communicate with an access node using a first frequency band and a first series of time allocations. A low-latency link is also configured that uses the wireless interface radio to communicate with at least one client device using a second frequency band and a second series of time allocations. Since the first series of time allocations and the second series of time allocations are non-overlapping, the two links are a combination of time and frequency multiplexed. A time indicator is sent to a client device that is communicating via the second frequency band. Responsive to this time indicator, the client device selects a time to transmit that is during one of the second series of time allocations.

In an example, a low-latency link between a client device and a soft access point is configured. This low-latency link uses a first frequency band and a first series of time allocations. The access point communicates with a wireless network access node (e.g., wireless router connected to the Internet) using a second frequency band and a second series of time allocations. The first series of time allocations and the second series of time allocations are non-overlapping. A time indicator is received from the access point via the low-latency link. Responsive to this time indicator, the client device is configured to select a transmit time that is during a one of the first series of time allocations.

In an example, a first wireless interface link to communicate with an access node using a first channel of a frequency band is established. A second wireless interface link to communicate with a client device using a second channel of the frequency band is also established. Via the first wireless interface link, a first message to the access node indicating the first wireless interface link is to enter a first dormant state is sent. Data is concurrently received from the access node using the first channel and the client device using the second channel by demodulating a wide channel comprising the first channel and the second channel. The concurrently received data including an indicator that the access node has received the first message indicating the first wireless interface link is to enter the first dormant state.

In an example, a low-latency link between the client device and a soft access point device is configured. The low-latency link is configured to use a first frequency band and a first series of time allocations. The soft access point device is to communicate with a network access node using a second frequency band and a second series of time allocations. The first series of time allocations and the second series of time allocations are to be non-overlapping. Via the low-latency link, a first message is transmitted to the soft access point using the first frequency band during a first one of the first series of time allocations. In response to not receiving, via the first frequency band, a first acknowledgement associated with the first message, a first retry of the first message is sent to the soft access point using the second frequency band during the first one of the first series of time allocations. In response to receiving, via the second frequency band, a second acknowledgment associated with the first retry of the first message, a second message is sent to the soft access point using the second frequency band during the first one the first series of time allocations.

In an example, a wireless interface radio is configured to communicate with a first access node using a first frequency band and a first series of time allocations. The wireless interface radio is also configured to communicate with at least one client device using a second frequency band and a second series of time allocations. The first series of time allocations and the second series of time allocations are non-overlapping. With the access node, a first wireless communication link associated with first media access control (MAC) identifier is established. With the access node, a second wireless communication link associated with a second MAC identifier is established. Information associated with the second MAC identifier is transmitted to constrain a timing that the access node will use for at least one transmission by the access node.

In an example, a wireless interface radio is configured to communicate with a first access node using a first frequency band and a first series of time allocations. The wireless interface radio is also configured to communicate with at least one client device using a second frequency band and a second series of time allocations. The first series of time allocations and the second series of time allocations are non-overlapping. A first wireless communication link associated with first media access control (MAC) identifier is established with the access node. Information associated with a second MAC identifier is transmitted to constrain a timing that the access node will schedule at least one transmission by the access node. The second MAC identifier is not associated with a wireless communication link with the access node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION OF THE EMBODIMENTS

Figure 1:
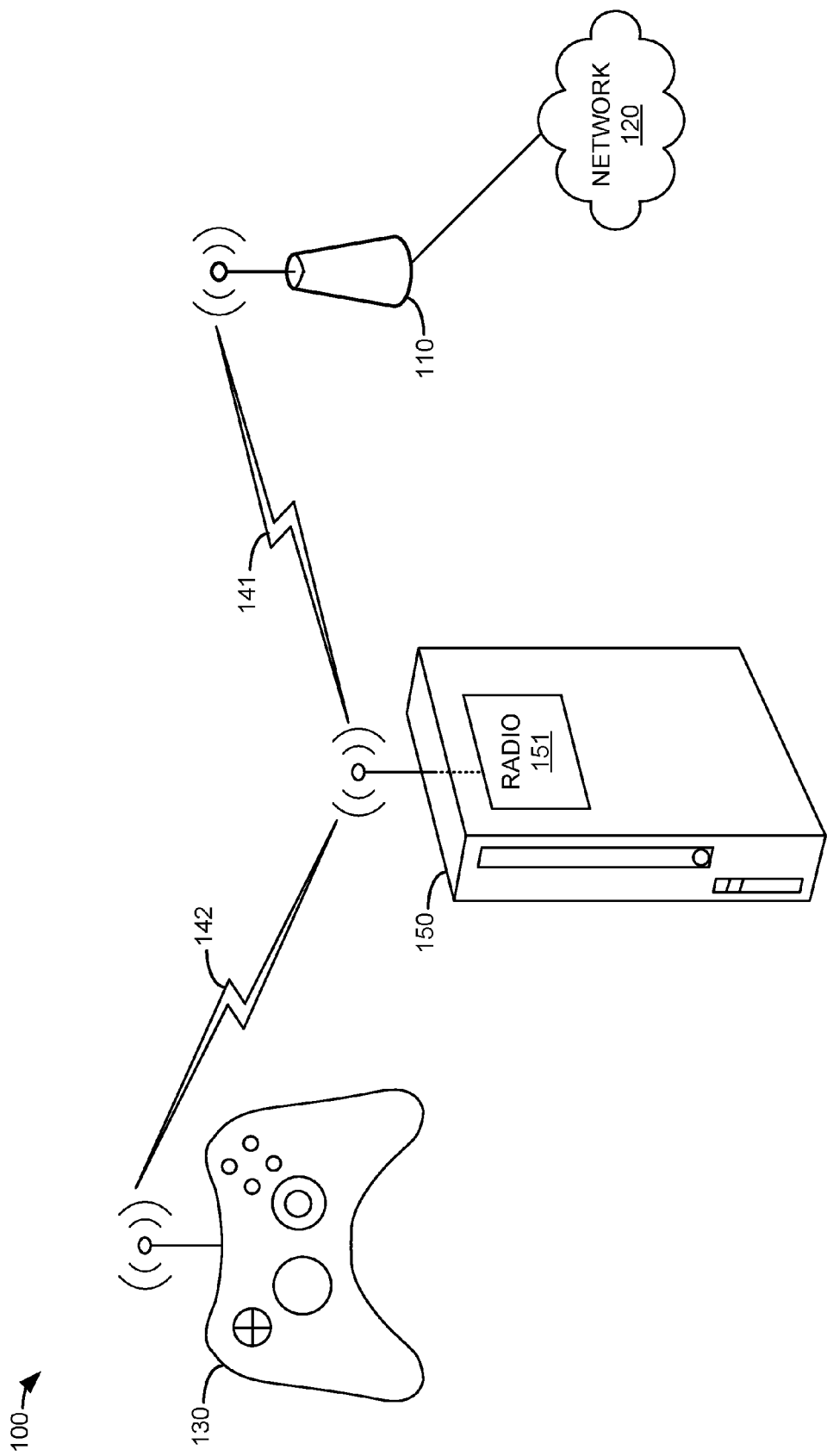
FIG. 1 is a block diagram illustrating a communication system.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include a machine-implemented method, a computing device, a state-machine implemented method, or wireless network device.

In an embodiment, a computing device (such as a computer gaming console, tablet PC, set-top box, smartphone, wireless enabled television, etc.) uses only a single radio to concurrently communicate with a wireless network access point and wireless client devices. For example, a game console may use a single radio to communicate with a Wi-Fi router and with game controllers. Typically, communication with the Wi-Fi router is desired to have high-throughput while communication with the game controllers is desired to have low-latency.

To establish and maintain both a high-throughput link with the Wi-Fi access point, and a low-latency link with the wireless game controller(s), the single Wi-Fi radio of the computing device is configured to periodically switch between a channel used for the high-throughput link and a different channel that is used for the low-latency link-thus implementing a combination of frequency division multiplexing (FDM) and time division multiplexing (TDM). However, because (at least) the access point used for the high-throughput link is unaware that the computing device is periodically switching channels, the computing device (and/or clients of the computing device's soft access point) may deviate from strict time-based channel switching in order to maintain reliable communication. In addition, the computing device may use aspects of the Wi-Fi protocol standard to ensure that periodically switching its single radio between the two channels is accomplished while maintaining reliable communication on both channels.

For example, one issue that can occur is when the wireless network access point for the high-throughput link is sending (and computing device is receiving) a beacon frame when the time for a channel switchover occurs. If the channel switchover were to occur on schedule, at least part of the information in the beacon frame would be missed. In an embodiment, the computing device postpones switching between channels in order to complete the reception of the beacon frame. The computing device may then shorten the time spent on the low-latency channel during a subsequent period that is allocated to the low-latency channel. This adjustment can be used to maintain an average period for cycling between channels, and/or maintain a sleep/wake schedule synchronization with client devices on the low-latency link.

In another example, a client device starts to transmit on the low-latency link a short time before a channel switchover is to occur. Again, if the channel switchover were to occur on schedule, at least part of the information being transmitted by the client device would be missed. In an embodiment, if a transmission by a client device is detected close to the channel switching time, the computing device can postpone switching between channels in order to completely receive the transmission from the client device. The computing device may then shorten the time spent on the high-throughput channel during a subsequent period allocated to the high-throughput channel. This adjustment can be used to maintain an average period for cycling between channels, and/or maintain a sleep/wake schedule synchronization with client devices on the low-latency link.

In another example, the relative time spent on the high-throughput channel versus the low-latency channel may be varied according to the traffic on one or both of the channels. In this manner, throughput on the high-throughput channel and latency on the low-latency channel can be optimized according to the activity on the channels.

In another example, the computing device can send scheduling and/or control information to its client devices via the low-latency links. This information can be used to prevent, or help prevent, attempts by the client devices on the low-latency link from trying to transmit while the computing device is configured to listen to only the high-throughput channel. For example, the computing device may send a recommended sleep duration to a client device. This sleep duration can be selected such that the client device will (or is likely to) remain asleep while the computing device is configured to listen to the high-throughput channel.

In another example, to prevent transmissions by the wireless network access point to the computing device via the high-throughput channel while the computing device is operating on the low-latency channel, the computing device can indicate (e.g., in a NULL frame on the high-throughput channel) to the wireless network access point that it is going to sleep. If, for some reason, the wireless network access point does not respond to this message (e.g., with an ACK frame), the computing device may switch into a mode whereby the computing device can monitor the high-throughput channel for an acknowledgement while simultaneously listening for traffic from client devices on the low-latency channel.

In another example, if the wireless network access point has not acknowledged that the computing device is going to sleep, and the computing device wants to transmit on the low-latency link (as opposed to just listening), the computing device can send a transmission on the high-throughput channel that appears to be from a device that is not connected to the wireless network access point. This transmission can indicate a transmission duration that corresponds to the time the computing device needs to transmit on the low-latency link. In this manner, the Wi-Fi inter-network/intra-channel collision avoidance algorithm used by the wireless network access point will prevent the wireless network access point from transmitting to the computing device (or any other Wi-Fi device.) After the computing device has completed its transmission on the low-latency link, the computing device can switch into the aforementioned mode whereby the computing device can monitor the high-throughput channel for an acknowledgement while simultaneously listening for traffic on the low-latency channel.

In another example, when it is time for the computing device to switch its single radio from the high-throughput channel to the low-latency channel (i.e., an FDM-TDM channel switch), the wireless network access node may be sending a beacon frame. Likewise, relatively close to the start of a beacon frame transmission, the computing device may have sent an indicator (e.g., in a NULL frame on the high-throughput channel) to the wireless network access point that the computing device is going to sleep. However, because the wireless network access point is sending, or about to send, a beacon frame, the wireless network access point defers sending an acknowledgement that the computing device is going to sleep. To prevent these cases from occurring, the computing device can adjust the time allocations spent on the high-throughput channel such that the beacon frame transmissions occur while the computing device is operating on the high-throughput channel.

In another example, when it is time for the computing device to switch its single radio from the high-throughput channel to the low-latency channel (i.e., an FDM-TDM channel switch), the wireless network access node may be sending broadcast or multicast frames. Since the wireless network access node is busy sending these frames, the computing device may not be able to send an indicator to the wireless network access point that it is going to sleep and/or receive an acknowledgement. To prevent this from occurring, the computing device can send transmissions on the high-throughput channel that appears to be from a device that is connected to the wireless network access point, but that is not identified (e.g., by MAC address) as being the computing device (i.e., a 'virtual' client). These transmissions indicate to the wireless network access point that the virtual client device will be sleeping at all times except those close to the beacon time. Since broadcast/multicast frames are sent at times when all of the clients are awake, the wireless network access point will be constrained to schedule broadcast/multicast frames close to the beacon time when the virtual client device appears to wireless network access node to be awake.

In another example, when it is time for the computing device to switch its single radio from the high-throughput channel to the low-latency channel (i.e., for a FDM-TDM channel switch), the wireless network access node may be sending aggregated frames to another client (i.e., not the computing device). Since the wireless network access node is busy sending these frames, the computing device may not be able to send an indicator to the wireless network access point that the computing device is going to sleep and/or receive an acknowledgement. When this occurs, the computing device may elect to continue to switch channels according to the FDM-TDM time allocations without informing the wireless network access point that the computing device is going to sleep. By continuing to switch without informing the wireless network access node, the computing device may switch away and then back to the high-throughput channel before the aggregated frame transmission completes. By returning to the high-throughput channel before the frame transmission completes, it is unlikely that the computing device will miss a transmission from the wireless network access point, or disconnect the link with the computing device.

FIG. 1 is a block diagram illustrating a communication system. In FIG. 1, communication system 100 comprises wireless network access node 110, network 120, client device 130, and computing device 150. Computing device 150 includes radio 151. Wireless network access node 110 is operatively coupled to network 120. Wireless network access node 110 is operatively coupled to computing device 150 by wireless link 141. Client device 130 is operatively coupled to computing device 150 by wireless link 142.

Wireless network access node 110 is a network element capable of providing wireless communication to wireless capable devices (e.g., computing device 150.) Wireless network access node 110 can be, for example, one or more of a Wi-Fi access node, a Wi-Fi hotspot, a Wi-Fi gateway, a base transceiver station, a radio base station, an eNodeB device, or an enhanced eNodeB device. Wireless network access node 110 is connected to network 120. Example devices that may be, comprise, and/or include wireless network access node 110 include, but are not limited to, example wireless capable device 2100 (described herein with reference to FIG. 21) and/or example computer system 2200 (described herein with reference to FIG. 22).

Network 120 is a wide area communication network that can provide wired and/or wireless communication to wireless network access node 110. Network 120 and can comprise wired and/or wireless communication networks that include processing nodes, routers, gateways, physical and/or wireless data links for carrying data among various network elements, including combinations thereof, and can include a local area network, a wide area network, and an internetwork (including the Internet). Network 120 can also comprise wireless networks, including base station, wireless communication nodes, telephony switches, internet routers, network gateways, computer systems, communication links, or some other type of communication equipment, and combinations thereof. Wired network protocols that may be utilized by network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Links between elements of network 120, can be, for example, twisted pair cable, coaxial cable or fiber optic cable, or combinations thereof. Wireless network protocols that may be utilized by communication system 100 may comprise one or more IEEE 802 specified protocols.

Other network elements may be present in network 120 to facilitate communication with wireless network access node 110 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional computing devices, client devices, access nodes, routers, gateways, and physical and/or wireless data links for carrying data among the various network elements.

In an embodiment, computing device 150 may be any device, system, combination of devices, or other such communication platform capable of communicating wirelessly with wireless network access node 110 and wirelessly with client device 130. Computing device 150 can operate using a single wireless interface radio 151 to establish wireless links 141 and 142 and communicate concurrently with wireless network access node 110 and client device 130, respectively. Computing device 150 may connect to wireless network access node 110 as a client of a wireless network (e.g., a wireless network associated with a single BSSID) provided by wireless network access node 110. Client device 130 may connect to a wireless network provided by computing device 150. The wireless network provided by computing device 150 may be a peer-to-peer type wireless network. Computing device 150 may be known as the 'soft access point' or 'soft-AP' for the network computing device 150 provides to client device 130 via wireless link 142. Example devices that may be, comprise, and/or include computing device 150 include, but are not limited to, example wireless capable device 2100 (described herein with reference to FIG. 21) and/or example computer system 2200 (described herein with reference to FIG. 22).

Client device 130 may be, for example, a video game controller, computer peripheral (e.g., mouse, keyboard, printer, speakers), a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with computing device 150 via wireless link 142. Other types of communication platforms are possible. Example devices that may be, comprise, and/or include client device 130 include, but are not limited to, example wireless capable device 2100 (described herein with reference to FIG. 21) and/or example computer system 2200 (described herein with reference to FIG. 22).

In an embodiment, computing device 150 controls and/or configures radio 151 to implement a combination of frequency division multiplexing (FDM) and time division multiplexing (TDM) for the communication via wireless link 141 and wireless link 142. In other words, radio 151 both switches between at least two frequency bands (i.e., channels) to implement frequency division multiplexing, and also communicates on a respective frequency band during a respective series of non-overlapping time allocations to implement time division multiplexing. Thus, radio 151 may periodically communicate with wireless network access node 110 during selected time periods using a first channel, and communicate with client device 130 using wireless link 142 using a second channel during the rest of the time. In an embodiment, the time periods are selected such that wireless link 141 is configured as a high-throughput link and wireless link 142 is configured as a low-latency link. In another embodiment, the time periods are selected such that wireless link 142 is configured as a high-throughput link and wireless link 141 is configured as a low-latency link.

Wireless network access node 110 may be unaware that computing device 150 is using FDM-TDM channel switching to communicate via wireless links 141 and 142 using a single radio 151. Accordingly, wireless network access node 110 may function under an assumption that wireless link 141 is always on the same channel and is conforming to the protocol associated with the wireless network type being provided by wireless network access node 110.

In an embodiment, computing device 150 may control radio 151 to deviate from strict fixed time channel switching in order to maintain reliable communication with both client device 130 and/or wireless network access node 110. In typical operation, computing device 150 communicates alternately with wireless network access node 110 via link 141 and with client device 130 via link 142. When communicating with wireless network access node 110, radio 151 uses a first channel. When communicating with client device 130, radio 151 uses a second channel. At nominally fixed intervals (i.e., TDM), radio 151 is switched between the first channel and the second channel (i.e., FDM)

Wireless network access node 110 may be sending (or will be unable to complete) a beacon frame when a time for FDM-TDM channel switch from link 141 to link 142 occurs. If the switchover of radio 151 from link 141 to link 142 were to occur at that predetermined time, at least part of the information in the beacon frame would be missed by computing device 150. In an embodiment, computing device 150 does not switch between channels at the predetermined time and instead delays the switch in order to complete the reception of the beacon frame from wireless network access node 110. Computing device 150 may delay the FDM-TDM channel switch by a predetermined amount of time (e.g., several of milliseconds) that allows for the complete reception of any beacon frame which would not complete before the time nominally scheduled for the FDM-TDM channel switch.

After a FDM-TDM channel switch from link 141 to 142 is delayed to allow reception of the beacon frame to complete, computing device 150 may then shorten the next (or any subsequent) time spent on link 141. This adjustment can be used to maintain an average (or nominal) period for cycling between links 141 and 142. This adjustment can also be used to help maintain a sleep/wake schedule synchronization with client device 130 and link 142.

Client device 130 may be sending (or will be unable to complete) a transmission when a time for a FDM-TDM channel switch from link 142 to link 141 occurs. If the switchover of radio 151 from link 142 to link 141 were to occur at that predetermined time, at least part of the information transmitted by client device 130 could be missed by computing device 150. In an embodiment, computing device 150 does not switch between channels at the predetermined time and instead delays the switch in order to complete the reception of the transmission from client device 130. Computing device 150 may delay the FDM-TDM channel switch by a predetermined amount of time (e.g., several of milliseconds) that allows for the complete reception of any client device 130 transmission which would not complete before the time nominally scheduled for the FDM-TDM channel switch.

After a FDM-TDM channel switch from link 142 to 141 is delayed to allow reception of the beacon frame to complete, computing device 150 may then shorten the next (or any subsequent) time spent on link 141. This adjustment can be used to maintain an average (or nominal) period for cycling between links 141 and 142. This adjustment can also be used to help maintain a sleep/wake schedule synchronization with client device 130 and link 142.

In an embodiment, the relative time spent communicating via link 141 versus the time spent communicating via link 142 can be varied by computing device 150 according to the traffic on one or both of the channels. In another embodiment, the relative time spent communicating via link 141 versus the time spent communicating via link 141 be can varied by computing device 150 based on one or more of: an application being run on computing device 150, a device classification of client device 130 (e.g., mouse vs. keyboard vs. game controller, etc.) In this manner, throughput on link 141 and latency on link 142 can be optimized according to the activity on the channels and/or expected needs of an applications and/or client device. Likewise, throughput on link 142 and latency on link 141 can be optimized according to the activity on the channels and/or expected needs of an applications and/or client device.

In an embodiment, computing device 150 sends scheduling and/or control information to client device 130 via link 142. This information can be used to prevent, or help prevent, attempts by client device 130 to transmit while radio 151 is configured to listen to only link 141. For example, computing device 150 may send a recommended sleep duration to client device 130. This sleep duration can be selected by computing device 150 such that client device 130 will (or is likely to) remain asleep during period(s) of time when radio 151 is configured to listen on link 141.

As described herein, computing device 150 regularly spends at least some time with radio 151 configured to communicate via link 142. When radio 151 is configured to communicate via link 142, it cannot communicate via link 141. In an embodiment, before performing a FDM-TDM channel switch from link 141 to link 142, computing device 150 sends an indicator to wireless network access node 110. This indicator informs wireless network access node 110 that, as far as link 141 is concerned, computing device 150 is going to sleep and will not be receiving communication via link 141. Wireless network access node 110 confirms receipt of this indicator by sending computing device 150 an acknowledgement message via link 141. When computing device 150 receives the acknowledgement message via link 141, computing device 150 may perform a FDM-TDM channel switch to link 142 (or go to sleep.)

Wireless network access node 110 may not respond to the 'going to sleep' indicator before the predetermined time for the FDM-TDM channel switch from link 141 to link 142. This lack of response may occur because wireless network access node 110 is busy with other traffic (e.g., sending a beacon frame) or interference (e.g., traffic on another wireless network operating on the same or nearby channels.) Computing device 150 may then monitor link 141 and link 142 simultaneously. Computing device 150 may monitor link 141 in order to receive the acknowledgement message. Computing device 150 may monitor link 142 in order to receive transmissions from client device 130 and respond to these transmissions with a limited maximum latency time period. Computing device 150 may monitor both link 141 and 142 by receiving and demodulating communication on both the channel used by link 141 and the channel used by link 142. For example, if both link 141 and 142 use orthogonal frequency division multiplexing (OFDM), Computing device 150 may monitor both link 141 and 142 by receiving at least the OFDM carriers associated with link 141 and link 142, discarding data corresponding to OFDM carriers not used by links 141 and 142, and then separately (i.e., by link or channel) processing the data associated with the respective OFDM carriers associated with each link 141 and 142. In an embodiment, appropriate filters and/or filter banks may be used for performing the desired separation.

Computing device 150 may have data to transmit to client device 130 when wireless network access node 110 has not responded to the 'going to sleep' indicator before a predetermined time for a FDM-TDM channel switch from link 141 to link 142. To prevent wireless network access node 110 from transmitting on link 141 while computing device 150 is transmitting data to client device 130 after the channel switch to link 142, computing device 150 can send a transmission on the same channel as link 141. This transmission is sent such that the transmission appears to be from a device that is not connected to wireless network access node 110. This transmission can indicate a transmission duration that corresponds to the time the computing device needs to transmit on link 142. In this manner, a collision avoidance algorithm used by wireless network access node 110 can prevent the wireless network access node 110 from transmitting via link 142 for the specified transmission duration. After the computing device 150 has completed its transmission on link 142, computing device 150 can switch into the aforementioned mode whereby computing device 150 can monitor link 141 for an acknowledgement while simultaneously listening for traffic on link 142.

To prevent (or help prevent) cases where wireless network access node 110 is delayed from sending an acknowledgment due to a beacon frame transmission (or impending beacon frame transmission), computing device 150 can adjust the time allocations (and/or timing of the FDM-TDM channel switches) spent on link 141 and link 142 such that the beacon frame transmissions occur while radio 151 is known to be (or very likely to be) configured to be on link 141.

Broadcast or multicast frames being sent by wireless network access node 110 may also cause computing device 150 and/or wireless network access node 110 from communicating or responding to a 'going to sleep' message. Computing device 150 can send a transmission on the high-throughput channel that appears to be from a device that is connected to the wireless network access node 110, but where that device is not computing device 150 (i.e., a 'virtual' client of wireless network access node 110 created by computing device 150 for this purpose.) This transmission can indicate to wireless network access node 110 that the virtual client device will be sleeping at all times except those close to the beacon time. Since broadcast/multicast frames are sent at times when all of the clients of wireless network access node 110 are awake, wireless network access node 110 will be constrained to schedule broadcast/multicast frames close to the beacon time. This at least limits the effect of broadcast/multicast frames to switchover times that are close to the beacon time.

Aggregated frames being sent by wireless network access node 110 may also cause computing device 150 and/or wireless network access node 110 from communicating or responding to a 'going to sleep' message. Since wireless network access node 110 is busy sending these aggregated frames, computing device 150 may not be able to send the 'going to sleep' indicator to wireless network access node 110 and/or receive an acknowledgement. When this occurs, computing device 150 may elect to continue to switch between links 141 and 142 according to the FDM-TDM time allocations without informing wireless network access node 110 that it is going to sleep. By continuing to switch without informing wireless network access node 110, computing device 150 may switch away from link 141 to link 142 and then back to link 141 before the aggregated frame transmission completes. By returning to link 141 before the frame transmission completes, computing device 150 may not miss a transmission from wireless network access node 110, or need to re-establish link 141.

Figure 2:
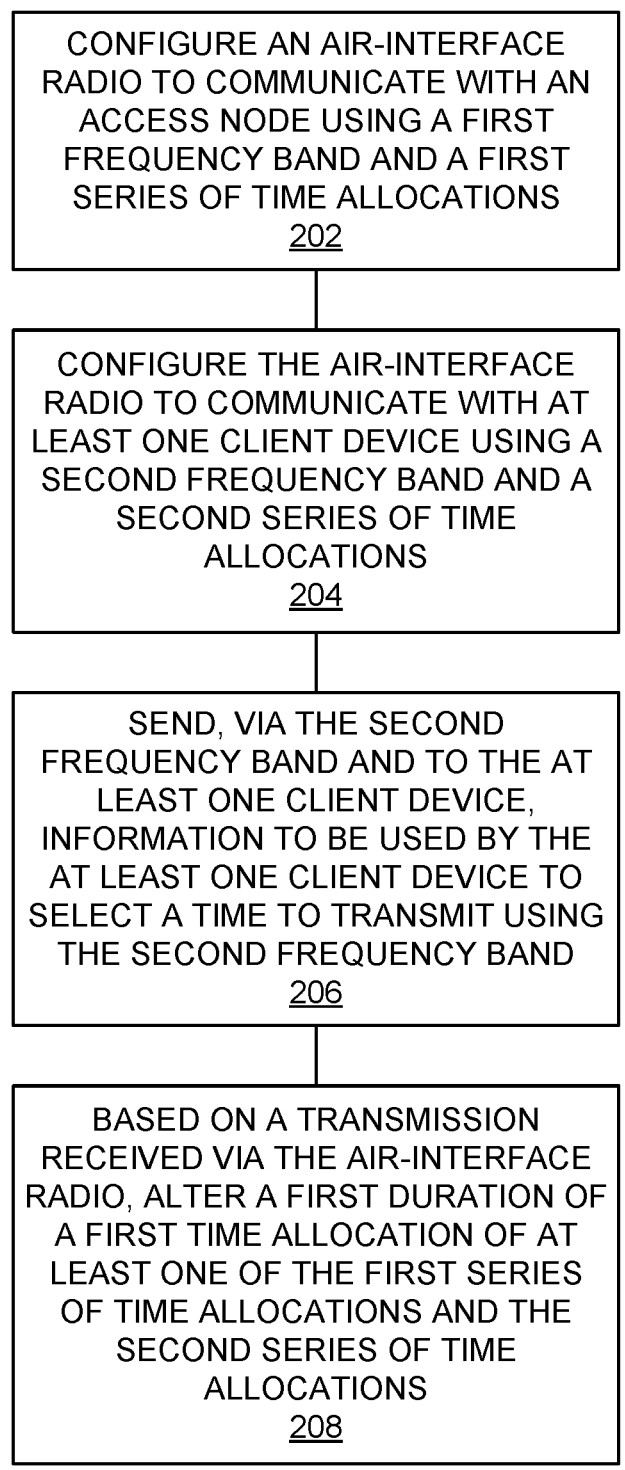
FIG. 2 is a flowchart illustrating a method of operating a communication system.

FIG. 2 is a flowchart illustrating a method of operating a communication system. The steps illustrated in FIG. 2 may be performed by one or more elements of communication system 100. A wireless interface radio is configured to communicate with an access node using a first frequency band and a first series of time allocations (202). For example, radio 151 may be periodically (and repetitively) configured and reconfigured by computing device 150 to communicate with wireless network access node 110 using a first wireless channel (i.e., frequency band—such as Wi-Fi channel 1) and a first series of time allocations (e.g., the first 4 ms of an 8 ms cycle).

The wireless interface radio is configured to communicate with at least one client device using a second frequency band and a second series of time allocations (204). For example, radio 151 may be periodically (and repetitively) configured and reconfigured by computing device 150 to communicate with client device 130 using a second wireless channel (i.e., frequency band—such as Wi-Fi channel 6) and a second series of time allocations (e.g., the second 4 ms of an 8 ms cycle).

Via the second frequency band, and to the at least one client device, information to be used by the at least one client device to select a time to transmit using the second frequency band is sent (206). For example, computing device 150 may send, via the second frequency band and to client device 130, an indicator of a recommended (or commanded) sleep duration and/or wakeup time. When the recommended time arrives, client device 130 may wakeup and transmit to computing device 150 using link 142. Computing device 150 may select the indicator of a recommended (or commanded) sleep duration and/or wakeup time such that radio 151 will be tuned to the second frequency band when client device 130 wakes up.

Based on a transmission received via the wireless interface radio, a first duration of a first time allocation of at least one of the first series of time allocations and the second series of time allocations is altered (208). For example, based on a transmission on link 142 from client device 130, computing device 150 may delay (i.e., postpone) the FDM-TDM channel switching of channels from a predetermined time to a later time. The amount of delay/postponement may be a predetermined duration.

In a particular example, when computing device 150 determines that a transmission on link 142 from client device 130 is unlikely to, or will not, complete before the predetermined time for the FDM-TDM channel switch, computing device 150 may extend the time radio 151 listens to link 142 this cycle. Likewise, when computing device 150 determines that a transmission (e.g., regular traffic, beacon frame, multicast frame, and/or aggregated frame) on link 141 from wireless network access node 110 is unlikely to, or will not, complete before the predetermined time, computing device 150 may extend the time radio 151 listens to link 142 this cycle. Responsive to extending a stay on one of the frequency bands, computing device 150 may shorten a subsequent (e.g., next) stay on the other frequency band. This second altered time allocation may be shortened by the amount that the first time allocation was lengthened. By extending a first time allocation for one frequency band, and shortening a second time allocation for the other frequency band, the overall cycle time between the two bands can be maintained at a desired average or mean cycle time. This can help keep the transmissions and/or wake-up times of client device 130 synchronized with computing device 150.

Figure 3:
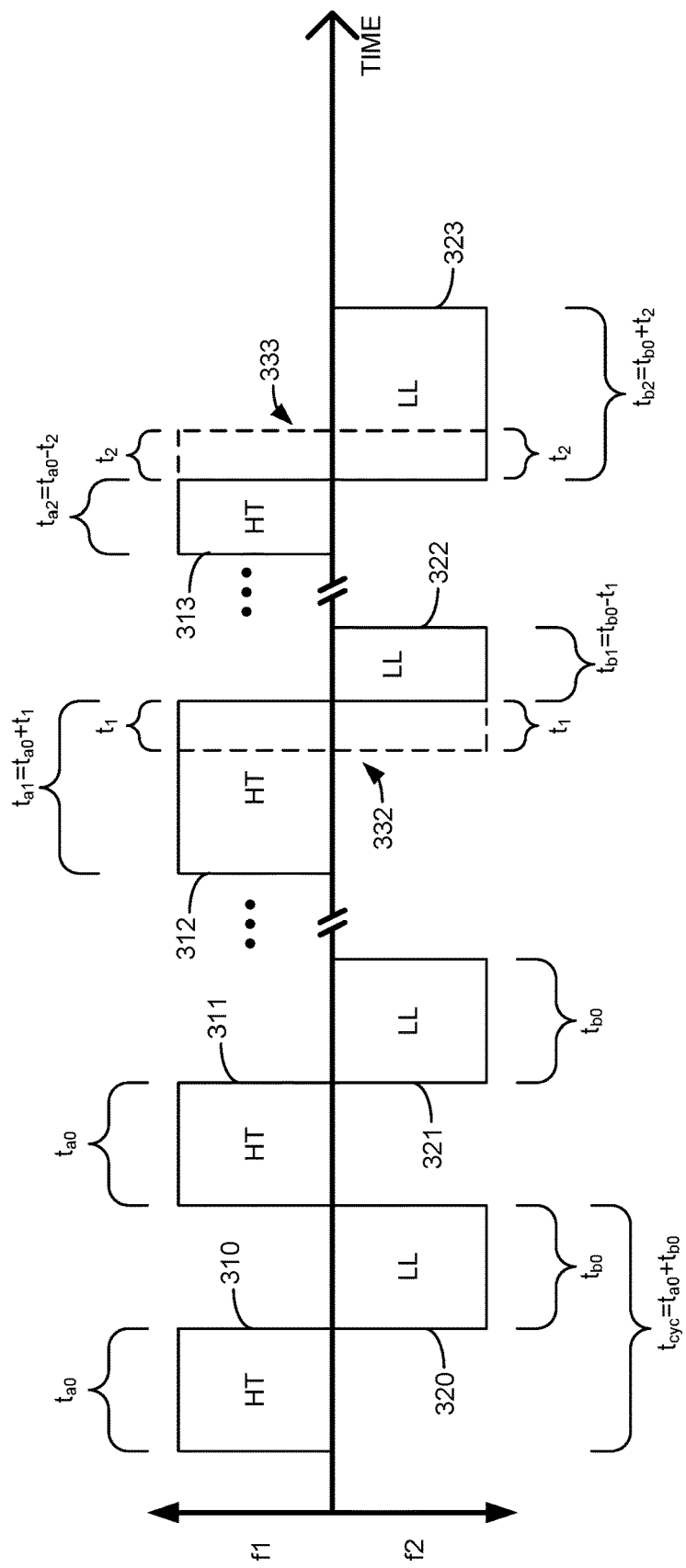
FIG. 3 is a diagram illustrating dynamic FDM-TDM channel switching.

FIG. 3 is a diagram illustrating dynamic FDM-TDM channel switching. In FIG. 3, the horizontal axis represents time, and the vertical axis represents frequency. A first frequency band, or channel, (f1) is shown above the horizontal axis. A second frequency band (f2) is shown below the horizontal axis. The first frequency band is configured to be a high-throughput link and is therefore denoted HT in FIG. 3. This first frequency band can correspond to link 141 between computing device 150 and wireless network access node 110. In another embodiment, this first frequency band can correspond to link 142 between computing device 150 and client device 130. The second frequency band is configured to be a low-latency link and is therefore denoted LL in FIG. 3. This second frequency band can correspond to link 142 between computing device 150 and client device 130. In another embodiment, this second frequency band can correspond to link 141 between computing device 150 and wireless network access node 110.

Typical (or nominal) FDM-TDM channel switching cycles are shown by FDM-TDM allocations 310, 311, 320, and 321. FDM-TDM allocations 310 and 311 are illustrated as being on the f1 frequency band and are of duration $t_{a0}$. FDM-TDM allocations 320 and 321 are illustrated as being on the f2 frequency band and are of duration $t_{b0}$. Thus, as can be seen from allocations 310 and 320 in FIG. 3, a FDM-TDM cycle is nominally $t_{cyc}=t_{a0}+t_{b0}$ in duration. It can also be seen from allocations 310, 311, 320, and 321 that the times that allocations 310 and 311 are active on the first frequency band do not overlap the times that allocations 320 and 321 are active on the second frequency band. Thus, allocations 310, 311, 320, and 321 effect a multiplexing scheme that implements a combination of non-overlapping FDM and non-overlapping TDM.

FIG. 3 also illustrates extended allocation 312 and shortened allocation 322. Extended allocation 312 and/or shortened allocation 322 may be the result of an extended stay (i.e., postponed FDM-TDM channel switching time) by computing device 150 on the f1 frequency band. FDM-TDM allocation 312 is illustrated as being on the f1 frequency band for a duration $t_{a1}=t_{a0}+t_1$. Dashed line 322 illustrates the nominal switching time (i.e., without allocation 312 being extended and/or allocation 322 being shortened) between allocation 312 and 322. FDM-TDM allocation 322 is illustrated as being on the f2 frequency band for a duration $t_{b1}=t_{b0}-t_1$. Thus, as can be seen from allocations 312 and 322 in FIG. 3, the FDM-TDM cycle encompassing allocations 312 and 322 is nominally $t_{cyc}=t_{a0}+t_{b0}$ in duration.

FIG. 3 also illustrates shortened allocation 313 and extended allocation 323. Shortened allocation 313 and/or extended allocation 323 may be the result of a shortened stay by computing device 150 on the f1 frequency band. FDM-TDM allocation 313 is illustrated as being on the f1 frequency band for a duration $t_{a2}=t_{a0}-t_2$. Dashed line 333 illustrates the nominal switching time (i.e., without allocation 313 being shortened and/or allocation 323 being lengthened) between allocation 313 and 323. FDM-TDM allocation 322 is illustrated as being on the f2 frequency band for a duration $t_{b2}=t_{b0}+t_2$. Thus, as can be seen from allocations 313 and 323 in FIG. 3, the FDM-TDM cycle encompassing allocations 313 and 323 is nominally $t_{cyc}=t_{a0}+t_{b0}$ in duration. In an embodiment, $t_1$ may be a predetermined amount of time. In another embodiment, $t_1$ may be dynamically adjusted by computing device 150. The dynamic adjustments made to $t_1$ may be based on factors such as the type of transmission that caused a postponement to a FDM-TDM channel switching cycle, traffic on the current (or next) channel, an application being run on computing device 150, a device classification of client device 130 (e.g., mouse vs. keyboard vs. game controller, etc.), or other factors that contribute to the performance (e.g., latency and/or throughput) of communication system 100, and links 141 and 142, in particular.

Figure 4A:
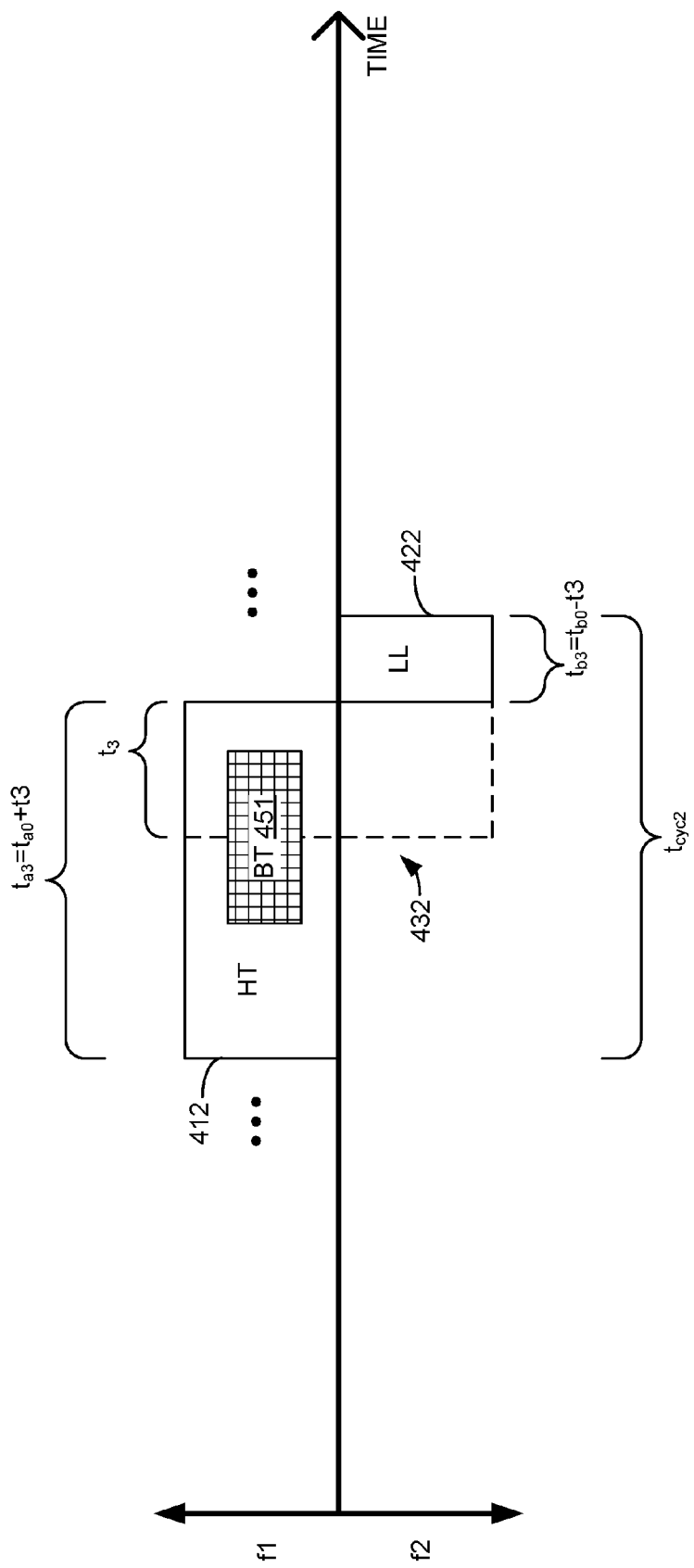
FIG. 4A is a diagram illustrating an extended stay on a high-throughput channel.

FIG. 4A is a diagram illustrating an extended stay on a high-throughput channel. In FIG. 4A, the horizontal axis represents time, and the vertical axis represents frequency. A first frequency band, or channel (f1) is shown above the horizontal axis. A second frequency band (f2) is shown below the horizontal axis. The first frequency band is configured to be a high-throughput link and is therefore denoted HT in FIG. 4A. This first frequency band can correspond to link 141 between computing device 150 and wireless network access node 110. The second frequency band is configured to be a low-latency link and is therefore denoted LL in FIG. 4A. This second frequency band can correspond to link 142 between computing device 150 and client device 130.

FIG. 4A illustrates a first FDM-TDM allocation 412 that is on the f1 frequency band and a second FDM-TDM allocation 422 that is on the f2 frequency band. Dashed line 432 illustrates the time a nominal FDM-TDM channel switch would occur between allocation 412 and allocation 422. Transmission (BT) 451 is illustrated on the f1 frequency band. Transmission 451 begins before the nominal FDM-TDM channel switch would have occurred (as shown by line 432), and ends after the nominal FDM-TDM channel switch would have occurred. Accordingly, allocation 412 is illustrated in FIG. 4A as being extended by $t_3$ in order to entirely encompass the time that transmission 451 is occurring. Thus, the total duration of allocation 412 after being extended is $t_{a3}=t_{a0}+t_3$. Likewise, allocation 422 is illustrated in FIG. 4A as being shorted by $t_3$ to a duration of $t_{b3}=t_{b0}-t_3$. This helps maintain (at least an average) a FDM-TDM cycle time of $t_{cyc}=t_{a3}+t_{b3}=t_{a0}+t_{b0}$. In an example, transmission 451 can be a beacon or other type transmission sent by wireless network access node 110 that computing device 150 should not ignore.

Figure 4B:
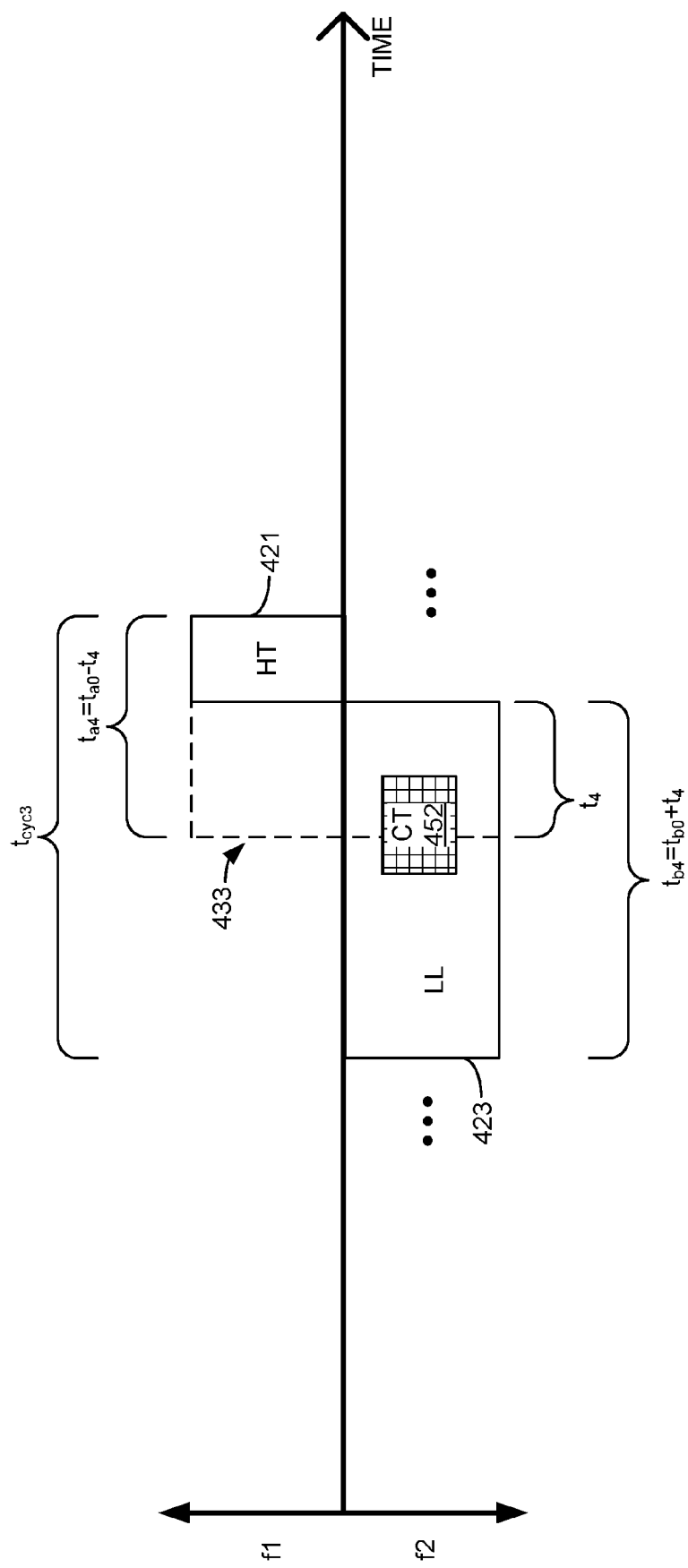
FIG. 4B is a diagram illustrating an extended stay on a low-latency channel.

FIG. 4B is a diagram illustrating an extended stay on a low-latency channel. In FIG. 4B, the horizontal axis represents time, and the vertical axis represents frequency. A first frequency band, or channel, (f1) is shown above the horizontal axis. A second frequency band (f2) is shown below the horizontal axis. The first frequency band is configured to be a high-throughput link and is therefore denoted HT in FIG. 4B. This first frequency band can correspond to link 141 between computing device 150 and wireless network access node 110. The second frequency band is configured to be a low-latency link and is therefore denoted LL in FIG. 4B. This second frequency band can correspond to link 142 between computing device 150 and client device 130. In an embodiment, link 141 can be configured to be a low-latency link and is therefore correspond to LL in FIG. 4B. Likewise, in an embodiment, link 142 can be configured to be a high-throughput link and therefore correspond to HT in FIGS. 4A-4C.

FIG. 4B illustrates a first FDM-TDM allocation 423 that is on the f2 frequency band and a second FDM-TDM allocation 421 that is on the f1 frequency band. Dashed line 433 illustrates the time a nominal FDM-TDM channel switch would occur between allocation 423 and allocation 421. Transmission (CT) 452 is illustrated on the f2 frequency band. Transmission 452 begins before the nominal FDM-TDM channel switch would have occurred (as shown by line 433), and ends after the nominal FDM-TDM channel switch would have occurred. Accordingly, allocation 423 is illustrated in FIG. 4B as being extended by $t_4$ in order to entirely encompass the time that transmission 452 is occurring. Thus, the total duration of allocation 423 after being extended is $t_{b4}=t_{b0}+t_4$. Likewise, allocation 421 is illustrated in FIG. 4B as being shorted by $t_4$ to a duration of $t_{a4}=t_{a0}-t_4$. This helps maintain (at least an average) a FDM-TDM cycle time of $t_{cyc}=t_{a4}+t_{b4}=t_{a0}+t_{b0}$. In an example, transmission 452 can be a data transmission sent by client device 130 that computing device 150 should not ignore.

Figure 5:
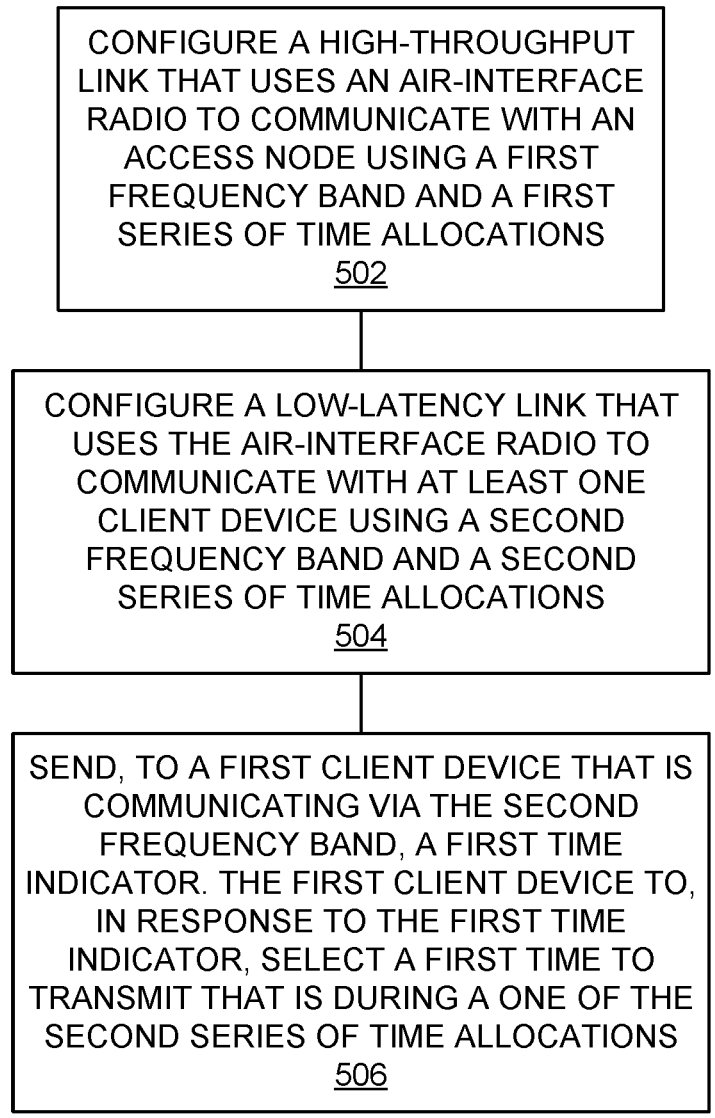
FIG. 5 is a flowchart illustrating a method of scheduling a transmission by a client device.

FIG. 5 is a flowchart illustrating a method of scheduling a transmission by a client device. The steps illustrated in FIG. 5 may be performed by one or more elements of communication system 100. A high-throughput link that uses a wireless interface radio to communicate with an access node using a first frequency band and a first series of time allocations is configured (502). For example, computing device 150 may configure link 141 as a high-throughput link that is periodically operates on a first frequency band during a first set of allocated time durations.

A low-latency link that uses the wireless interface radio to communicate with at least one client device using a second frequency band and a second series of time allocations is configured (504). For example, computing device 150 may configure link 142 as a low-latency link that is periodically operates on a second frequency band during a second set of allocated time durations.

A first time indicator is sent to a first client device that is communicating via the second frequency band. In response to the first time indicator, the client device selects a first time to transmit that is during a one of the second series of time allocations (506). For example, computing device 150 may send a message to client device 130 instructing client device 130 to 'wake up' at a selected time (or, roughly equivalently, is to remain 'asleep' for a selected period). In response to this message, client device 130 selects a time to 'wake up' and send data or otherwise communicate with computing device 150 via link 142.

The first time indicator may be specified as an absolute time or referenced to, for example, a boundary (beginning or end) of one of the first or second series of time allocations, or a boundary between ones of the first and second series of time allocations. Depending on the time selected by the client device, when the client 'wakes up' and transmits, computing device 150 may need to extend or shorten one or more of the first and second series of time allocations as described herein.

It should also be understood that, in an embodiment, the configured roles of links 141 and 142 may be swapped. In other words, link 141 may be configured to be a low-latency link and link 142 may be configured to be a high-throughput link.

Figure 6:
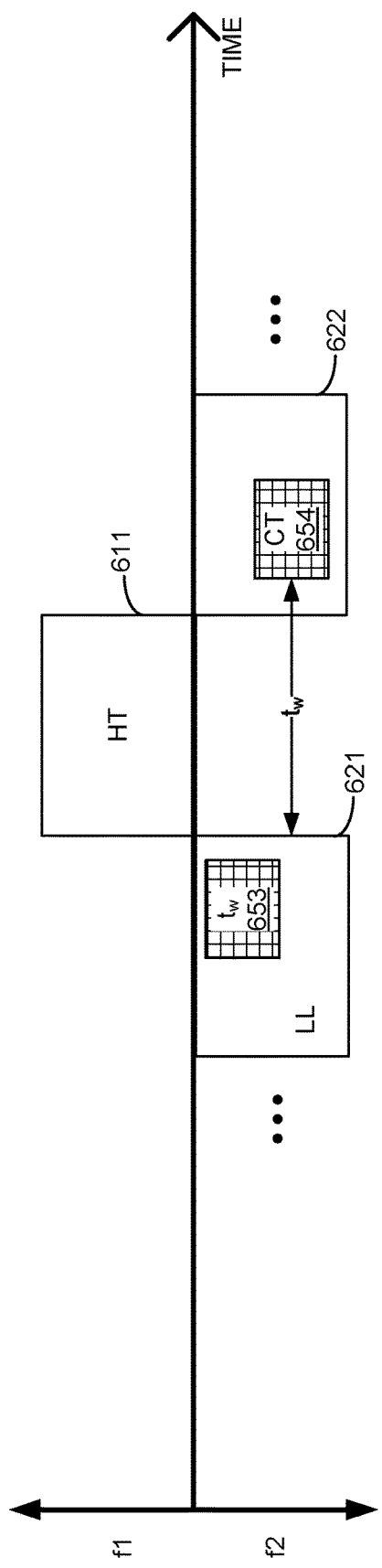
FIG. 6 is a diagram illustrating a scheduled transmission.

FIG. 6 is a diagram illustrating a scheduled transmission. In FIG. 6, the horizontal axis represents time, and the vertical axis represents frequency. A first frequency band, or channel, (f1) is shown above the horizontal axis. A second frequency band (f2) is shown below the horizontal axis. The first frequency band is configured to be a high-throughput link and is therefore denoted HT in FIG. 6. This first frequency band can correspond to link 141 between computing device 150 and wireless network access node 110. The second frequency band is configured to be a low-latency link and is therefore denoted LL in FIG. 6. This second frequency band can correspond to link 142 between computing device 150 and client device 130. In an embodiment, link 141 can be configured to be a low-latency link and is therefore correspond to LL in FIG. 6. Likewise, in an embodiment, link 142 can be configured to be a high-throughput link and therefor correspond to HT in FIG. 6.

FIG. 6 illustrates a first FDM-TDM allocation 621 that is on the f2 frequency band. Following allocation 621, a second FDM-TDM allocation 611 that is on the f1 frequency band is illustrated. Following allocation 611, a third FDM-TDM allocation 621 that is on the f2 frequency band is illustrated. A transmission with a time indicator ($t_w$) 653 is illustrated as occurring during time allocation 621. The time indicator 653 determines when transmission 654 is to occur (e.g., $t_w$ may specify a 'wake up' time for client device 130). Time indicator 653 is illustrated in FIG. 6 as being referenced to the boundary between allocation 621 and 611.

Figure 7:
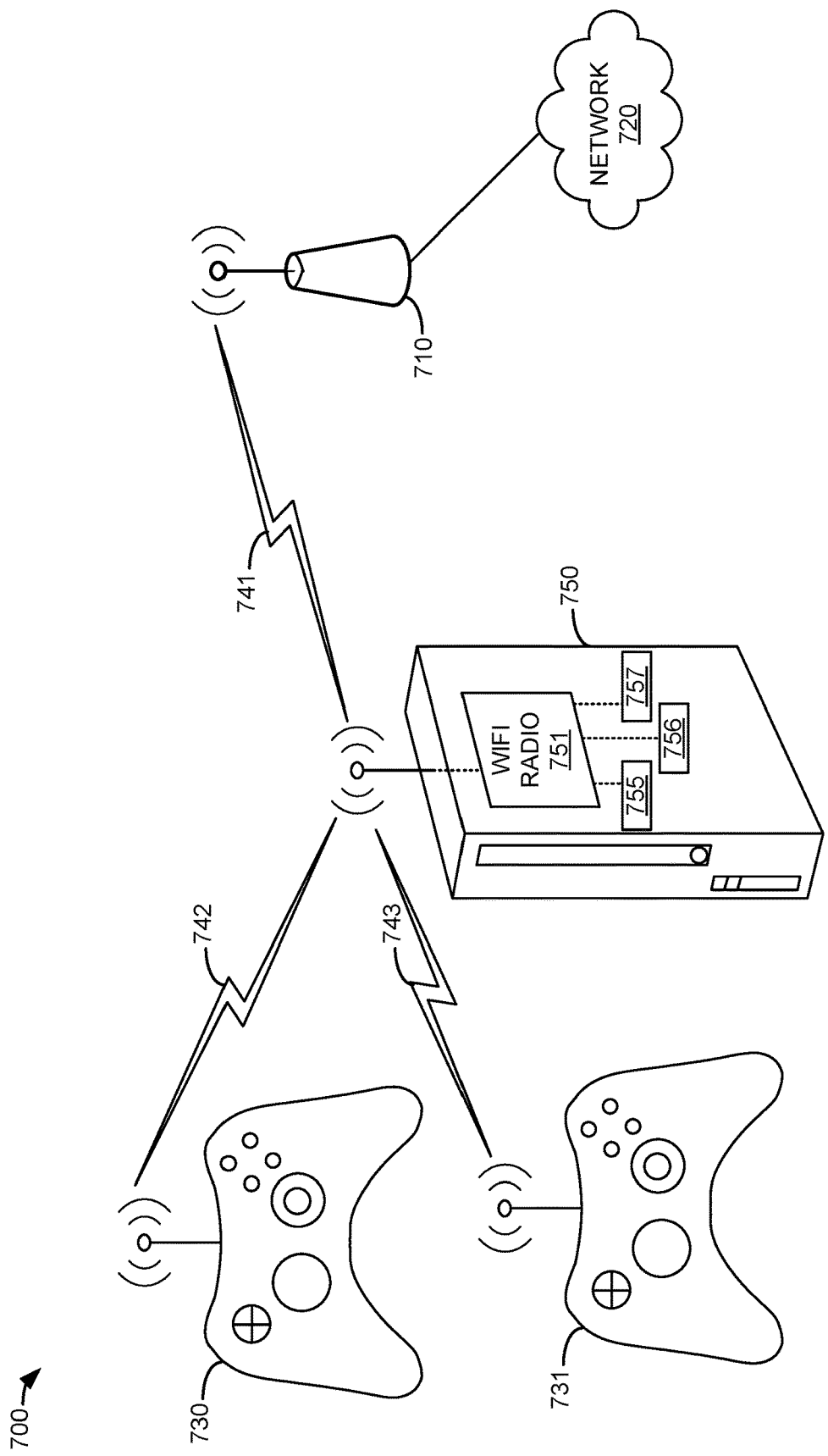
FIG. 7 is a block diagram illustrating a multi-channel single radio Wi-Fi communication system.

FIG. 7 is a block diagram illustrating a multi-channel single radio Wi-Fi communication system. In FIG. 7, communication system 700 comprises Wi-Fi access point 710, network 720, client device 730, client device 731, and computing device 750. Computing device 750 includes Wi-Fi radio 751. Wi-Fi access point 710 is operatively coupled to network 720. Wi-Fi access point 710 is operatively coupled to computing device 750 by wireless link 741. Client device 730 is operatively coupled to computing device 750 by wireless link 742. Client device 731 is operatively coupled to computing device 750 by wireless link 743.

Wi-Fi access point 710 is a network element capable of providing wireless communication to wireless devices (e.g., computing device 150) according to one or more the Wi-Fi (802.11) standards and its variants. Wi-Fi access point 710 can be, for example, one or more of a Wi-Fi access point (node), a Wi-Fi hotspot, a Wi-Fi gateway, a base transceiver station, a radio base station, an eNodeB device, or an enhanced eNodeB device. Wi-Fi access point 710 is connected to network 720. Example devices that may be, comprise, and/or include Wi-Fi access point 710 include, but are not limited to, example wireless capable device 2100 (described herein with reference to FIG. 21) and/or example computer system 2200 (described herein with reference to FIG. 22).

Network 720 is a wide area communication network that can provide wired and/or wireless communication to Wi-Fi access point 710. Network 720 and can comprise wired and/or wireless communication networks that include processing nodes, routers, gateways, physical and/or wireless data links for carrying data among various network elements, including combinations thereof, and can include a local area network, a wide area network, and an internetwork (including the Internet). Network 720 can also comprise wireless networks, including base station, wireless communication nodes, telephony switches, internet routers, network gateways, computer systems, communication links, or some other type of communication equipment, and combinations thereof. Wired network protocols that may be utilized by network 720 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Links between elements of network 720, can be, for example, twisted pair cable, coaxial cable or fiber optic cable, or combinations thereof. Wireless network protocols that may be utilized by communication system 700 may comprise one or more IEEE 802 specified protocols, Other network elements may be present in network 720 to facilitate communication with Wi-Fi access point 710 but are omitted for clarity, such as base stations, base station controllers, gateways, mobile switching centers, dispatch application processors, and location registers such as a home location register or visitor location register. Furthermore, other network elements may be present to facilitate communication between among elements of communication system 700 which are omitted for clarity, including additional computing devices, client devices, access nodes, routers, gateways, and physical and/or wireless data links for carrying data among the various network elements.

In an embodiment, computing device 750 may be any device, system, combination of devices, or other such communication platform capable of wirelessly communicating, using a single radio 751, with Wi-Fi access point 710 using a Wi-Fi specified protocol, and wirelessly communicating with client devices 730 and 731 using a latency optimized protocol specified for low latency. In another embodiment, computing device 750 may be any device, system, combination of devices, or other such communication platform capable of wirelessly communicating, using a single radio 751, with Wi-Fi access point 710 using a Wi-Fi specified protocol, and wirelessly communicating with client devices 730 and 731 using a Wi-Fi Direct specified protocol. Computing device 750 can operate using a single wireless interface radio 751 to establish wireless links 741, 742, and 743 and communicate concurrently with Wi-Fi access point 710 and client devices 730 and 731, respectively. Computing device 750 may connect to Wi-Fi access point 710 as a client of a Wi-Fi network (e.g., a wireless network associated with a single BSSID) provided by Wi-Fi access point 710 that also connects to network 720. Client devices 730 and 731 may connect to a wireless network provided by computing device 750. The wireless network provided by computing device 750 may be a peer-to-peer type wireless network (e.g. a latency optimized client network or a Wi-Fi Direct network.) Computing device 750 may include hardware and/or software that allows computing device 750 to function as what is known as a 'soft access point' or 'soft-AP' for a latency optimized or a WFD network provided by computing device 750 to client device 730 and client device 731.

Computing device 750 may include hardware and/or software to establish and maintain multiple client connections 755 and 756 to Wi-Fi access point 710 as clients of a Wi-Fi network provided by Wi-Fi access point 710. Likewise, computing device 750 may include hardware and/or software to establish and maintain a connection or apparent connection to a Wi-Fi access point that is not Wi-Fi access point 710. Client connection 755 is typically used as the client to carry traffic between Wi-Fi access point 710 and computing device 750. Client connections 756 and 757 are not typically used to carry traffic, and may thus be referred to as 'virtual' clients. Example devices that may be, comprise, and/or include computing device 750 include, but are not limited to, example wireless capable device 2100 (described herein with reference to FIG. 21) and/or example computer system 2200 (described herein with reference to FIG. 22).

Client devices 730 and 731 may be, for example, one or more of a video game controller, computer peripheral (e.g., mouse, keyboard, printer, speakers), a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with computing device 750 via client links 742 and 743. Other types of communication platforms are possible. Example devices that may be, comprise, and/or include client device 730 and/or client device 731 include, but are not limited to, example wireless capable device 2100 (described herein with reference to FIG. 21) and/or example computer system 2200 (described herein with reference to FIG. 22).

In an embodiment, computing device 750 controls and/or configures Wi-Fi radio 751 to implement a combination of frequency division multiplexing (FDM) and time division multiplexing (TDM) that alternates between communication via wireless link 741 and wireless links 742 and 743. In other words, Wi-Fi radio 751 both switches between at least two Wi-Fi channels to implement frequency division multiplexing, and also communicates on a respective Wi-Fi channel during a respective series of non-overlapping time allocations to implement time division multiplexing. Thus, Wi-Fi radio 751 may periodically communicate with Wi-Fi access point 710 during selected time periods using a first Wi-Fi channel (a.k.a., 'access point channel' or 'AP channel'), and communicate with one or more of client device 730 and client device 731 using a second Wi-Fi channel (a.k.a., 'client channel') during the rest of the time. In an embodiment, the time periods are selected such that wireless link 741 is configured as a high-throughput link and wireless links 742 and 743 are configured as a low-latency links. In another embodiment, the time periods are selected such that wireless link 741 is configured as a low-latency link and wireless links 742 and 743 are configured as a high-throughput links.

Virtual clients 756 and 757 can be used to manipulate the timing of transmissions between computing device 750 and Wi-Fi access point 710 on the AP channel. In order to manipulate the timing of communication on the AP channel, one or more of virtual client 756 and virtual client 757 can be used by computing device 750 to set busy indicators, and/or device sleep/wake indicators used by Wi-Fi access point 710. The busy indicators, and/or device sleep/wake indicators set by one or more of clients 755-757 can alter the timing of transmissions of the AP channel (e.g., by setting the network access vector—NAV.) These busy indicators, and/or device sleep/wake indicators set by one or more of clients 755-757 can alter the timing of certain types of transmissions (e.g., broadcast or multicast transmissions) on the AP channel.

Wi-Fi access point 710 may be unaware that computing device 750 is using FDM-TDM channel switching to communicate via wireless links 741 and 742 using a single radio 751. Accordingly, Wi-Fi access point 710 may function under an assumption that wireless link 741 is always on the same channel and is conforming to the Wi-Fi protocol associated with Wi-Fi access point 710.

In an embodiment, computing device 750 may control radio 751 to deviate from a strict fixed time channel switching scheme in order to maintain reliable communication with both client devices 730 and 731, and Wi-Fi access point 710. In typical operation, computing device 750 communicates alternately with Wi-Fi access point 710 via the AP channel and with client devices 730 and 731 via the client channel. When communicating with Wi-Fi access point 710, radio 751 is configured to use the AP channel. When communicating with client devices 730 and 731, radio 751 is configured to use the client channel. At nominally fixed intervals (i.e., TDM), radio 751 is switched between the AP channel and the client channel (i.e., FDM)

Wi-Fi access point 710 may be sending (or will be unable to complete) a beacon frame when the time for an FDM-TDM channel switch between the AP channel and the client channel occurs. If the switchover of radio 751 between the AP channel and the client channel were to occur at that predetermined time, at least part of the information in the beacon frame would be missed by computing device 750. In an embodiment, computing device 750 does not switch between channels at the predetermined time and instead delays the switch in order to complete the reception of the beacon frame from Wi-Fi access point 710. Computing device 750 may delay the FDM-TDM channel switch by a predetermined amount of time (e.g., several milliseconds) that allows for the complete reception of any beacon frame which would not complete before the time nominally scheduled for the FDM-TDM channel switch.

After a FDM-TDM channel switch between the AP channel and the client channel is delayed, computing device 750 may then shorten the next (or any subsequent) time spent on the client channel. This adjustment can be used to maintain an average (or nominal) period for cycling between the AP channel and the client channel. This adjustment can also be used to help maintain a sleep/wake schedule synchronization with client devices 730 and 731.

Client device 730 may be sending (or will be unable to complete) a data transmission at the time scheduled for a FDM-TDM channel switch between the client channel and the AP channel. If the switchover of radio 751 were to occur at that predetermined time, at least part of the information transmitted by client device 730 could be missed by computing device 750. In an embodiment, computing device 750 does not switch between Wi-Fi channels at the predetermined time and instead delays the channel switch in order to complete the reception of the transmission from client device 730. Computing device 750 may delay the FDM-TDM channel switch by a predetermined amount of time (e.g., several of milliseconds) that allows for the complete reception of any client device 730 or 731 transmission which would not complete before the time nominally scheduled for the FDM-TDM channel switch.

After a FDM-TDM channel switch is delayed to allow reception of the beacon frame to complete, computing device 750 may then shorten the next (or any subsequent) time allocation spent on the AP channel. This adjustment can be used to maintain an average (or nominal) period for cycling between Wi-Fi channels. This adjustment can also be used to help maintain a sleep/wake schedule synchronization with client devices 730 and 731.

In an embodiment, the relative time spent communicating via the AP channel versus the client channel can be varied by computing device 750 according to the traffic on one or both of the Wi-Fi channels. In another embodiment, the relative time spent communicating via the AP channel versus the client channel can be varied by computing device 750 based on one or more of: an application being run on computing device 750, a device classification of a client device 730 or 731 (e.g., mouse vs. keyboard vs. game controller, etc.) In this manner, throughput on the AP channel and latency the client channel can be optimized according to the activity on the channels and/or expected needs of an application and/or a client device 730 or 731.

In an embodiment, computing device 750 sends scheduling and/or control information to client device 730 and client device 731 using the client channel. This information can be used to prevent, or help prevent, attempts by client device 730 and/or client device 731 to use the client channel to transmit while radio 751 is configured to listen to only the AP channel. For example, computing device 750 may send a recommended sleep duration to client device 730. This sleep duration can be selected by computing device 750 such that client device 730 will (or is likely to) remain asleep during period(s) of time when radio 751 is configured to listen on the AP channel.

As described herein, computing device 750 regularly spends at least some time with radio 751 configured to communicate via the client channel. When radio 751 is configured to communicate client channel, it cannot communicate via the AP channel. In an embodiment, before performing a FDM-TDM channel switch from the AP channel to the client channel, computing device 750 sends an indicator to Wi-Fi access point 710 (e.g., using a NULL frame to specify a 'sleep' or 'power save' duration.) This indicator informs Wi-Fi access point 710 that, as far as Wi-Fi access point 710 is concerned, computing device 750 is going to sleep and will not be receiving communication via the AP channel. Wi-Fi access point 710 confirms receipt of this indicator by sending computing device 750 an acknowledgement message (e.g., ACK frame) via the AP channel. When computing device 750 receives the acknowledgement message via the AP channel, computing device 750 may perform an FDM-TDM channel switch to the client channel (or go to sleep.)

Wi-Fi access point 710 may not respond with the acknowledgement to the power save indicator before the predetermined time for the FDM-TDM channel switch from the AP channel to the client channel. This lack of an acknowledgement may occur because Wi-Fi access point 710 is busy with other traffic (e.g., sending a beacon frame) or interference (e.g., traffic on another wireless network operating on the same or nearby channels.) Computing device 750 may then monitor the AP channel and the client channel simultaneously. Computing device 750 may monitor the AP channel in order to receive the acknowledgement frame. Computing device 750 may monitor the client channel in order to receive transmissions from a client device 730 and respond to these transmissions within a selected maximum latency time period. Computing device 750 may monitor both the AP channel and the client channel simultaneously by receiving and demodulating communication on both the AP channel and the client channel. For example, since the AP channel and the client channel both use orthogonal frequency division multiplexing (OFDM), Computing device 750 may monitor both the AP channel and the client channel by receiving at least the OFDM carriers associated with the AP channel and the client channel, discarding data corresponding to OFDM carriers not used by the AP channel and the client channel (e.g., intervening channels when the AP channel and the client channel are on non-contiguous Wi-Fi channels), and then separately (i.e., by channel) processing the data associated with the respective OFDM carriers for the AP channel and the client channel. In an embodiment, appropriate filters and/or filter banks may be used for performing the desired separation.

Computing device 750 may have data to transmit to client device 730 when Wi-Fi access point 710 has not responded to the power save indicator before the predetermined time for the FDM-TDM channel switch from the AP channel to the client channel. To prevent Wi-Fi access point 710 from transmitting on the AP channel while computing device 750 is transmitting data to a client device 730 or 731 after the switch to the client channel, computing device 750 can send a transmission on the AP channel. This transmission is sent associated with an identifier (e.g., MAC address) such that the transmission appears to be from a device that is not connected to Wi-Fi access point 710. This transmission can indicate a transmission duration that corresponds to the time the computing device 750 needs to transmit on the client channel. In this manner, the Wi-Fi collision avoidance algorithm used by Wi-Fi access point 710 will prevent the Wi-Fi access point 710 from transmitting on the client channel for the specified transmission duration. After computing device 750 has completed its transmission on the client channel, computing device 750 can switch into the aforementioned mode whereby computing device 750 simultaneously monitors the AP channel and the client channel.

To prevent (or help prevent) cases where Wi-Fi access node 710 is delayed from sending an acknowledgment due to a beacon frame transmission (or impending beacon frame transmission), computing device 750 can adjust the time allocations (and/or timing of the FDM-TDM channel switches) spent the AP channel and the client channel such that the beacon frame transmissions occur while radio 751 is known to be (or very likely to be) configured to be on the AP channel.

Broadcast or multicast frames being sent by Wi-Fi access point 710 may also cause computing device 750 and/or Wi-Fi access point 710 from communicating or responding to a power save message. Computing device 750 can send a transmission on the AP channel that appears to be from a device that is connected to Wi-Fi access point 710, but where that device is not identified (e.g., by MAC address) as being computing device 750 (i.e., a 'virtual' client of Wi-Fi access point 710 created by computing device 750 for this purpose.) This transmission can indicate to Wi-Fi access point 710 that the virtual client device will be sleeping at all times except those close to the beacon time. Since broadcast/multicast frames are sent at times when all of the clients of Wi-Fi access point 710 are awake, Wi-Fi access point 710 will be constrained to scheduling broadcast/multicast frames close to the beacon time. This at least limits the effect of broadcast/multicast frames to switchover times that are close to the beacon time.

Aggregated frames being sent by Wi-Fi access point 710 may also cause computing device 750 and/or Wi-Fi access node 710 from communicating or responding to a power save message. Since Wi-Fi access point 710 is busy sending these aggregated frames, computing device 750 may not be able to send the power save indicator to Wi-Fi access point 710 and/or receive an acknowledgement. When this occurs, computing device 750 may elect to continue to switch between the AP channel and the client channel according to the FDM-TDM time allocations without informing Wi-Fi access point 710 that computing device 750 is going to sleep. By continuing to switch channels without informing Wi-Fi access point 710, computing device 750 may switch away from the AP channel and the client channel and then back to the AP channel before the aggregated frame transmission completes. By returning to the AP channel before the frame transmission completes, computing device 750 may not miss a transmission from Wi-Fi access point 710, or need to re-establish link 741.

Figure 8:
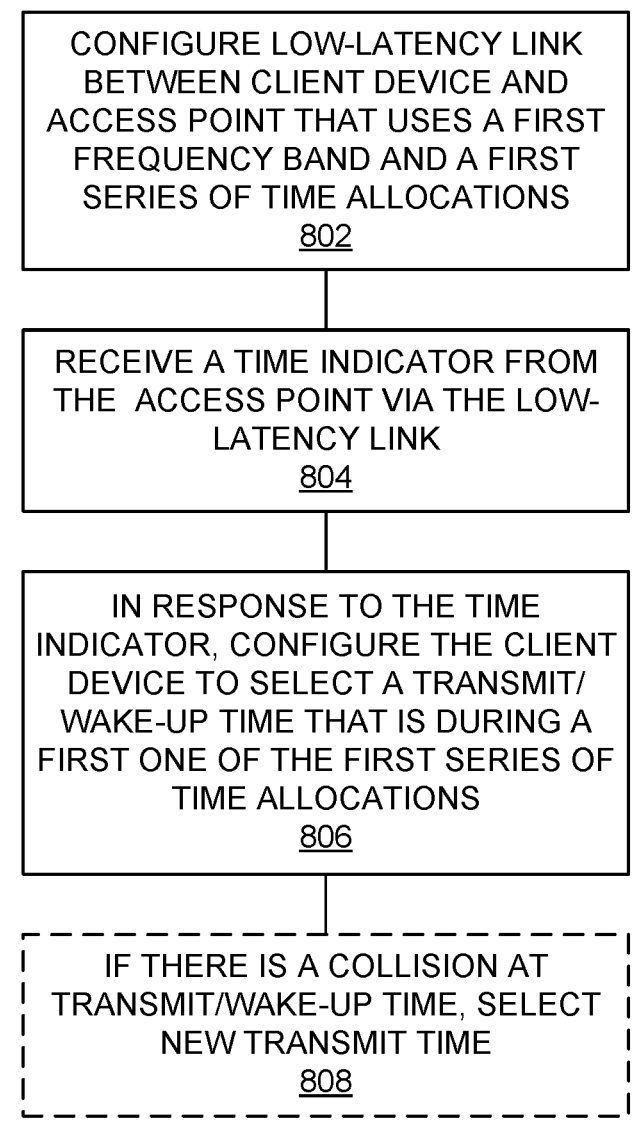
FIG. 8 is a flowchart illustrating a method for setting a transmission time by a client device.

FIG. 8 is a flowchart illustrating a method for setting a transmission time by a client device. The steps illustrated in FIG. 8 may be performed by one or more elements of communication system 100 and/or communication system 700. A low-latency link that uses a first frequency band and a first series of time allocations is configured (802). For example, client device 730 and computing device 750 and Wi-Fi access point 710 may establish and provision link 742 on the client channel. Computing device 750 may set parameters (such as time intervals/allocations for FDM-TDM channel switching) that allow client device 730 to communicate with computing device 730 via the client channel.

A time indicator from the access point is received via the low-latency link (804). For example, client device 730 may receive a time indicator 653 from computing device 750 instructing client device 730 to 'wake up' at a selected time (or, equivalently, is to remain 'asleep' for a selected period). In response to the time indicator, the client device is configured to select a transmit/wake-up time that is during a first one of the first series of time allocations (804). For example, in response to time indicator 653, client device 730 can configure itself to wake up at a time corresponding the time indicator 653 received from computing device 750. Computing device 750 can select this wake up time can fall within a time allocation for the client channel (e.g., transmission 654.)

Optionally, if there is a collision at the selected transmit/wake-up time, a new transmit/wake-up time is selected (808). For example, if, at the transmit/wake-up time, client device 730 detects that another device is transmitting at that time, client device 730 can select a new time to wake-up/transmit according a Wi-Fi collision avoidance procedure.

Figure 9:
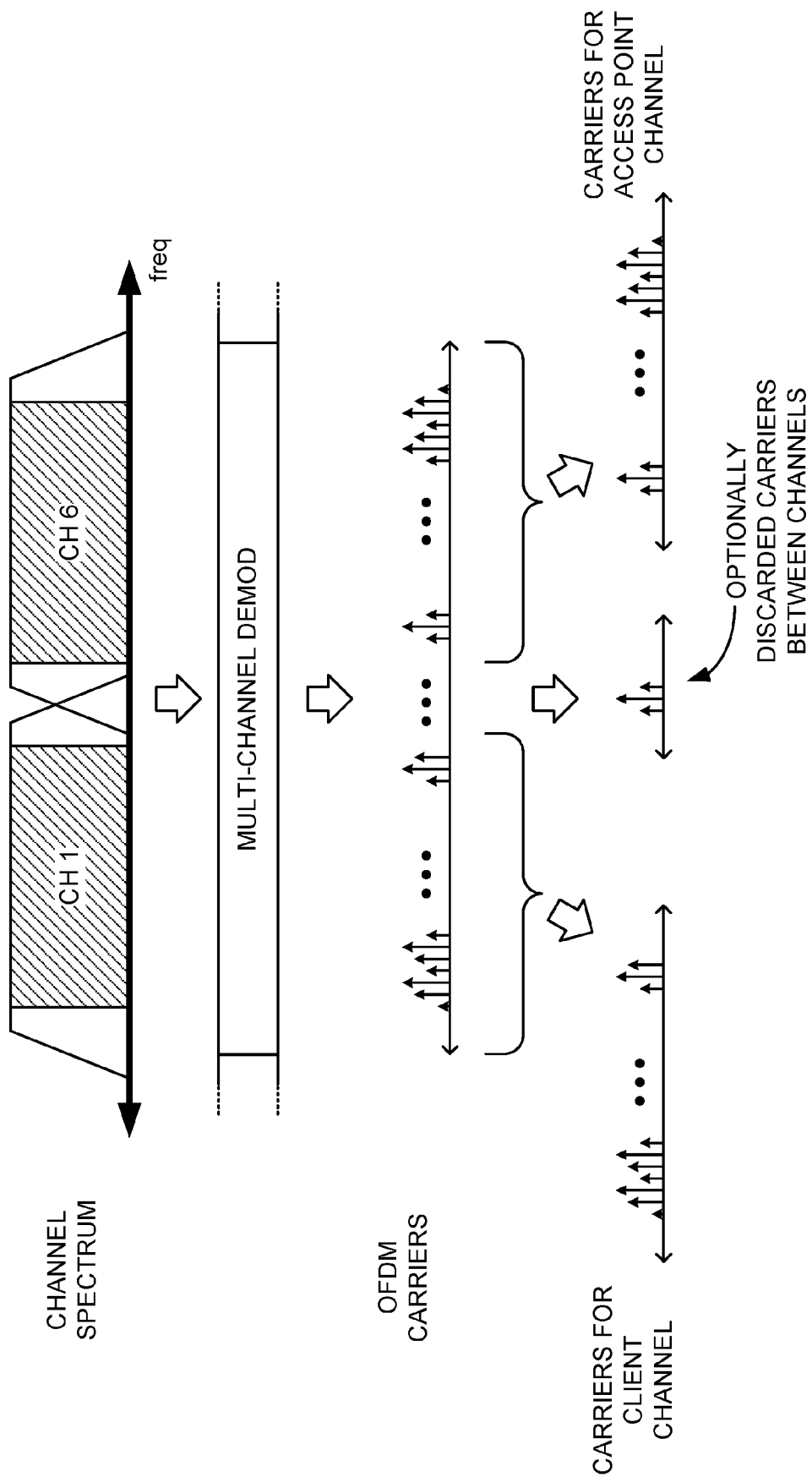
FIG. 9 is a diagram illustrating multi-channel reception by a single radio.

FIG. 9 is a diagram illustrating multi-channel reception by a single radio. As discussed herein, computing device 750 can monitor both the AP channel and the client channel. In FIG. 9, an example channel spectrum of Wi-Fi channel 1 (e.g., the AP channel) and Wi-Fi channel 6 (e.g., the client channel) are illustrated. Both channels are demodulated into OFDM carriers. Both channels may be demodulated into OFDM carriers by configuring radio 751 as if radio 751 were receiving a 40 MHz wide Wi-Fi channel that encompasses the two 20 MHz Wi-Fi channels 1 and 6. Alternatively, configuring radio 751 as if radio 751 were receiving an 80 MHz Wi-Fi channel can be used to receive contiguous or non-contiguous 20 MHz Wi-Fi channels, or contiguous 40 MHz wide channels. Likewise, configuring radio 751 as if radio 751 were receiving a 160 MHz Wi-Fi channel can be used to receive contiguous or non-contiguous 20 or 40 MHz Wi-Fi channels, or contiguous 80 MHz wide channels.

Figure 10:
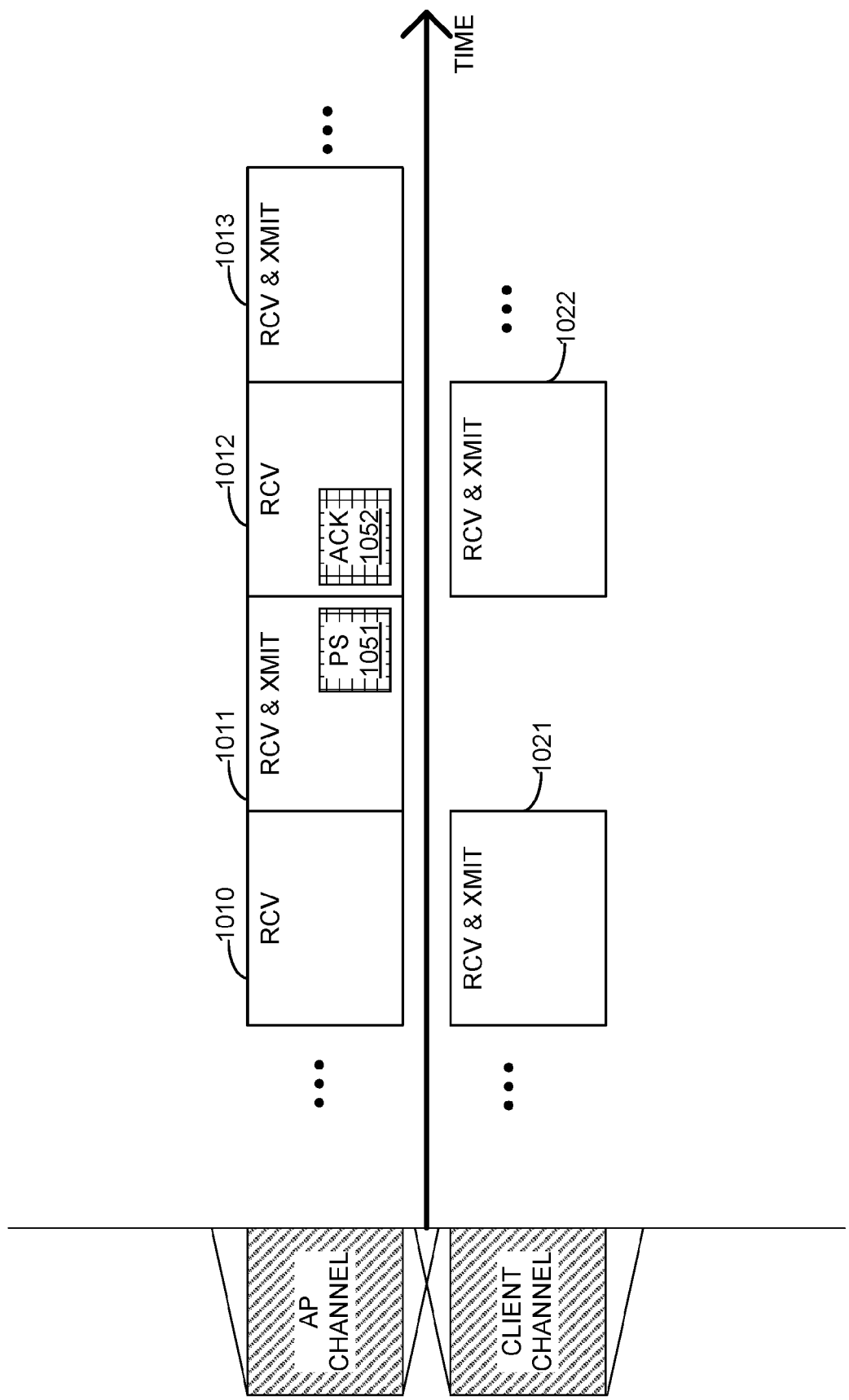
FIG. 10 is a diagram illustrating multi-channel reception to prevent holdover.

FIG. 10 is a diagram illustrating multi-channel reception to prevent holdover. In FIG. 10, the horizontal axis represents time, and the vertical axis represents frequency. A first Wi-Fi channel is shown above the horizontal axis. A second Wi-Fi channel is shown below the horizontal axis. The first Wi-Fi channel is operated to be a high-throughput link and is therefore denoted the AP channel in FIG. 10. This first frequency band can correspond to the channel used by link 741 between computing device 750 and Wi-Fi access point 710. The second frequency band is operated to be a low-latency link and is therefore denoted the client channel in FIG. 10. This second frequency band can correspond to the channel used by links 142 and 143 between computing device 750 and client devices 730 and 731, respectively.

FIG. 10 illustrates successive time allocations 1010, 1011, 1012, and 1013 on the AP channel. Also illustrated are time allocations 1021 and 1022 on the client channel. Allocation 1021 corresponds in time to allocation 1010. Allocation 1022 corresponds in time to allocation 1012. Allocations 1011, 1013, 1021 and 1022 are labeled to indicate both receiving and transmitting activities. Allocations 1010 and 1012 are labeled to indicate just receiving. It should be understood that radio 751 may not be able to simultaneously transmit and receive on a channel. Thus, in this case, it should be understood that the transmit and receive activities of radio 751 are time-division multiplexed according to the specified protocol on the respective channel. For example, radio 751 may spend part of the time in allocation 1011 receiving and part of the time transmitting. The switching between receiving and transmitting may be governed by the Wi-Fi protocol. In another example, radio 751 may spend part of the time in allocation 1022 receiving and part of the time transmitting. The switching between receiving and transmitting may be governed by the latency optimized client network protocol being used on the client channel.

In allocation 1011, a power save (i.e., 'going to sleep') indicator 1051 is transmitted. Indicator 1051 is transmitted by computing device 750. In allocation 1012, an acknowledgement 1052 to indicator 1051 is transmitted. Acknowledgement 1052 is transmitted by Wi-Fi access point 710 in response to receiving indicator 1051. It should be noted, however, that since allocation 1012 and allocation 1022 correspond in time, and allocation 1022 is nominally for client channel 1022, computing device 750 configures radio 751 in the multi-channel reception mode described herein (as further detailed herein with reference to at least FIG. 9 as an example). With radio 751 operating such that it can receive on the AP channel while both receiving and transmitting on the client channel, computing device 750 is able to receive acknowledgment 1052 in allocation 1012.

Figure 11:
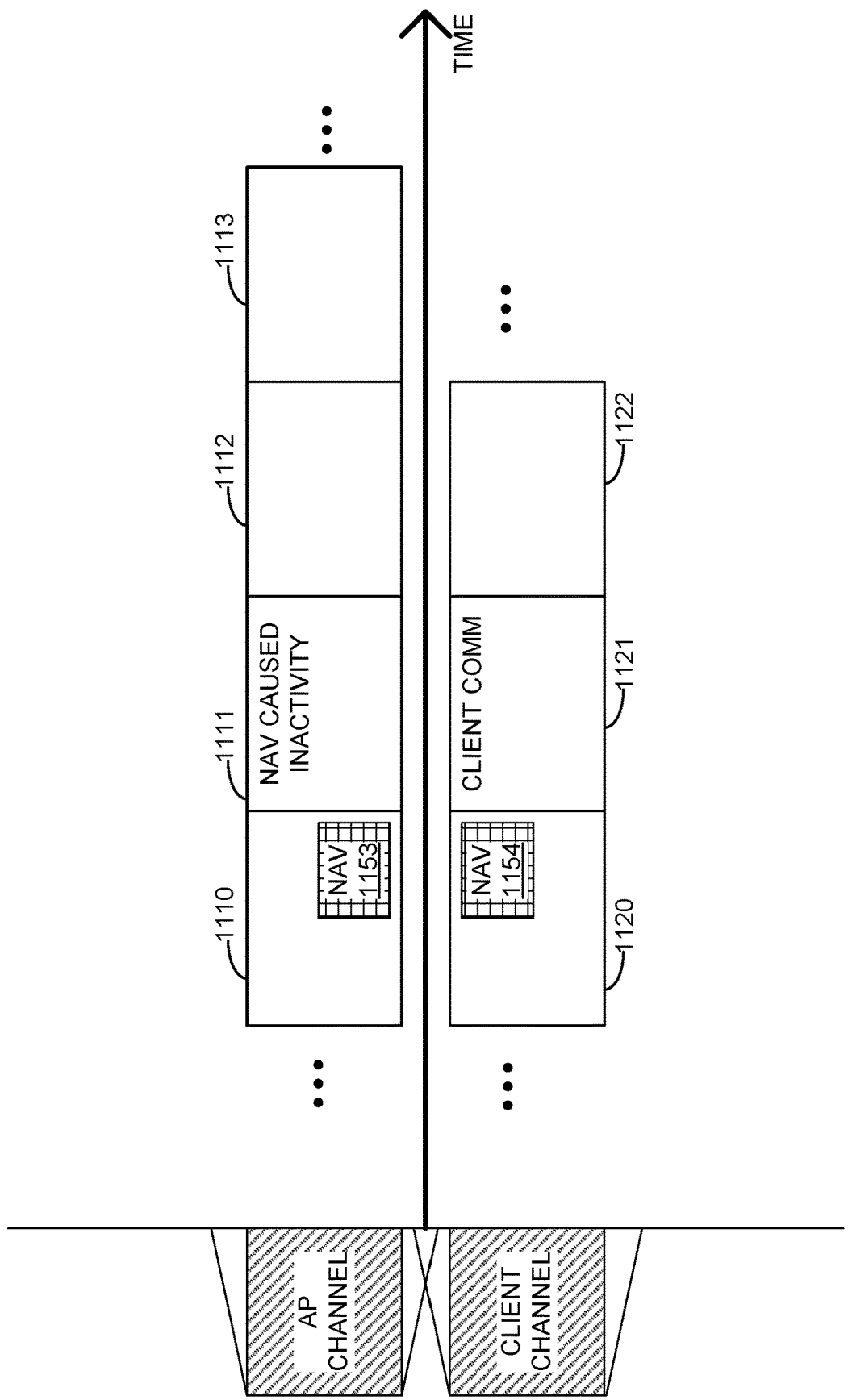
FIG. 11 is a diagram illustrating multi-channel transmission.

FIG. 11 is a diagram illustrating multi-channel transmission. In FIG. 11, the horizontal axis represents time, and the vertical axis represents frequency. A first Wi-Fi channel is shown above the horizontal axis. A second Wi-Fi channel is shown below the horizontal axis. The first Wi-Fi channel is operated to be a high-throughput link and is therefore denoted AP channel in FIG. 11. This first frequency band can correspond to the channel used by link 741 between computing device 750 and Wi-Fi access point 710. The second frequency band is operated to be a low-latency link and is therefore denoted client channel in FIG. 11. This second frequency band can correspond to the channel used by link 142 and 143 between computing device 750 and client devices 730 and 731, respectively.

FIG. 11 illustrates successive time allocations 1110, 1111, 1112, and 1113 on the AP channel. Also illustrated are successive allocations 1120, 1121, and 1122 on the client channel. Allocation 1120 corresponds in time to allocation 1110. Allocation 1121 corresponds in time to allocation 1111. Allocation 1122 corresponds in time to allocation 1112. In allocation 1110 a busy indicator (NAV) 1153 is transmitted by computing device 750 on the AP channel. In allocation 1120 (possibly simultaneous with busy indicator 1153) a busy indicator (NAV) 1153 is transmitted by computing device 750 on the client channel. In an embodiment, busy indicators 1153 and 1154 correspond to the Wi-Fi network access vector (NAV) in a Wi-Fi frame. It should be noted, that since busy indicator 1153 and busy indicator 1154 correspond in time, and busy indicator 1153 is not associated with a device that is connected on the AP channel, Wi-Fi access point 710 will respond to busy indicator 1153 by treating the AP channel as busy for all (or part—as specified by indicator 1153) of allocation 1111. Thus, Wi-Fi access point 710 will not transmit during allocation 1111 on the AP channel thereby allowing computing device 750 to transmit and receive on (at least) the client channel during allocation 1121.

Figure 12:
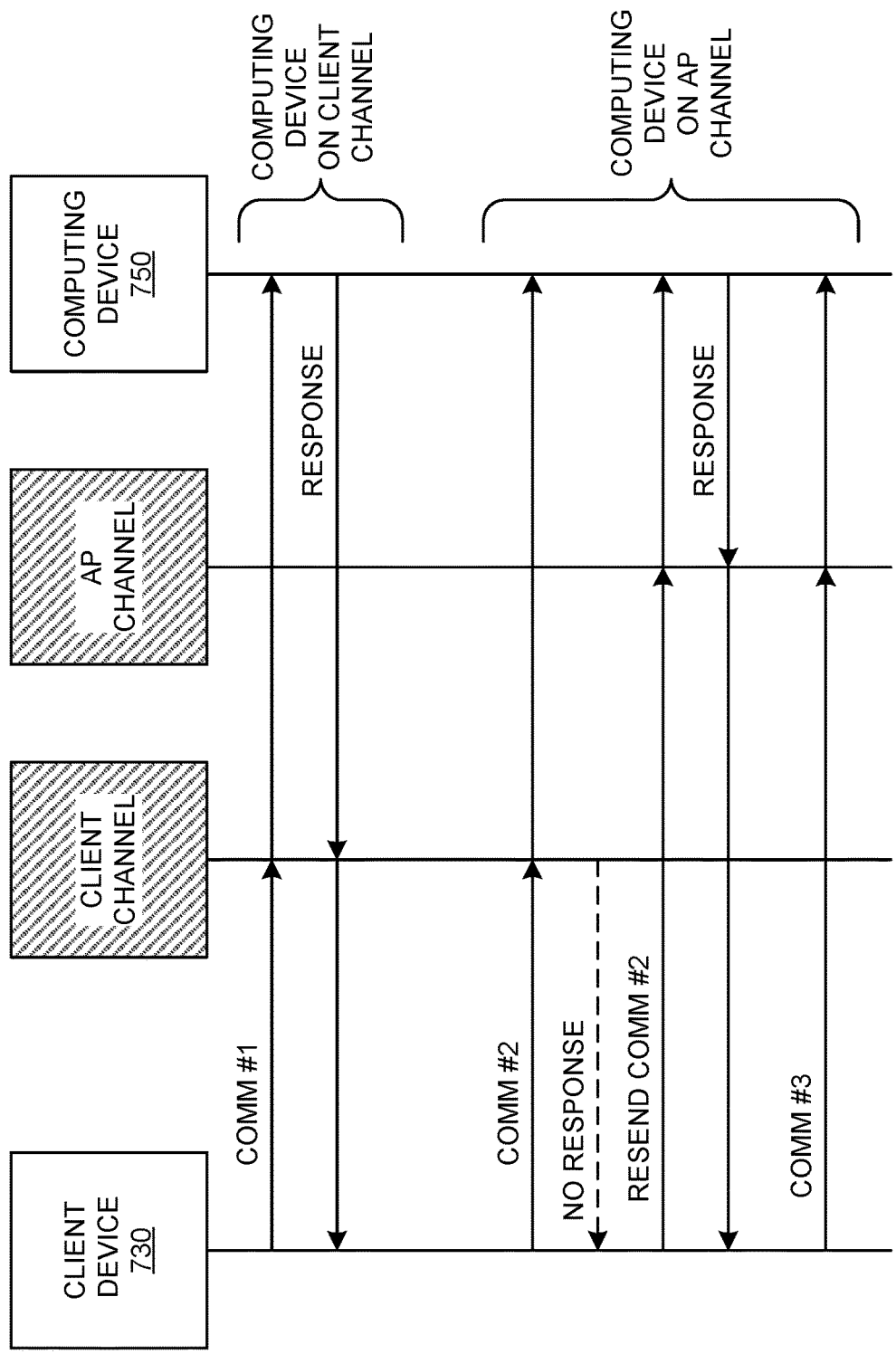
FIG. 12 is a diagram illustrating client device following.

FIG. 12 is a diagram illustrating client device following. When computing device 750 is operating on the client channel, client device 730 sends communication #1 to computing device 750 via the client channel. In response, computing device 750 sends a response back to client device 730 via the client channel. This is normal operation during FDM-TDM allocations on the client channel.

After a FDM-TDM channel switch has occurred and computing device 750 is operating on the AP channel, client device 730 sends communication #2 to computing device 750 via the client channel. However, since computing device 750 is operating on the AP channel, computing device 750 does not receive communication #2 and therefore does not send a response to client device 730 via the client channel.

Responsive to not receiving a response via the client channel, client device 730 resends communication #2 via the AP channel. This time, since computing device 750 is operating on the AP channel, computing device 750 receives the retried communication #2 via the AP channel and therefore sends a response to client device 730 via the AP channel. In response to receiving the response via the AP channel, client device 730 send communication #3 via the AP channel. Thus, it should be understood that in an embodiment, client device 730 can 'follow' computing device 750 from the client channel to the AP channel (and back).

Figure 13:
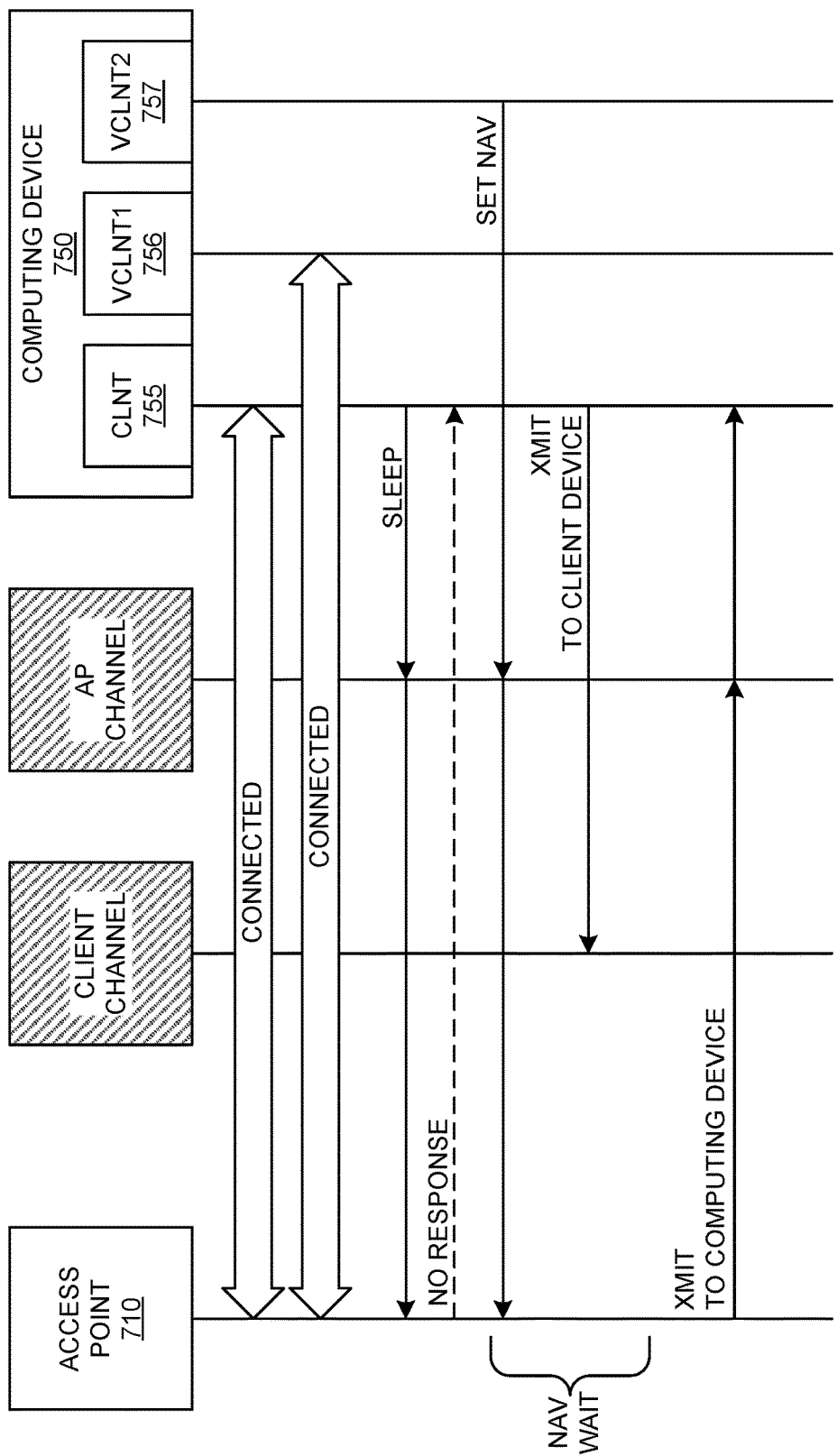
FIG. 13 is a diagram that illustrates setting an access node transmission time.

FIG. 13 is a diagram that illustrates setting an access node transmission time. The processes illustrated in FIG. 13 may be performed by one or more elements of communication system 100 and/or communication system 700. At the start of the diagram, 'real' client 755 of computing device 750 and 'virtual' client 756 are connected to Wi-Fi access point 710. Virtual client 757, however, is not (and normally will never be) connected to Wi-Fi access point 710. Client 755 of computing device 750 sends a power save (or 'sleep') indicator message to Wi-Fi access point 710 via the AP channel. Computing device 750 may have client 755 send the indicator message to Wi-Fi access point 710 so that computing device 750 will appear 'asleep' to Wi-Fi access point 710. This allows computing device 750 to configure radio 751 to operate on the client channel during a client channel time allocation. However, for at least one of the reasons described herein (e.g., Wi-Fi access point 710 is busy with other traffic, beacon frame, etc.) Wi-Fi access point 710 does not send a response to computing device 750.

In response to not receiving a response from Wi-Fi access point 710 via the AP channel, computing device 750 has virtual client 757 send a transmission on the AP channel. This transmission includes a network access vector (NAV) selected to give computing device 750 (and client 755 of computing device 750, in particular) time to operate on the client channel by making the AP channel appear to be busy to Wi-Fi access point 710. When the time set by virtual client 757 expires, Wi-Fi access point 710 can send a transmission to computing device 750 (and client 755 of computing device 750, in particular) via the AP channel.

Figure 14:
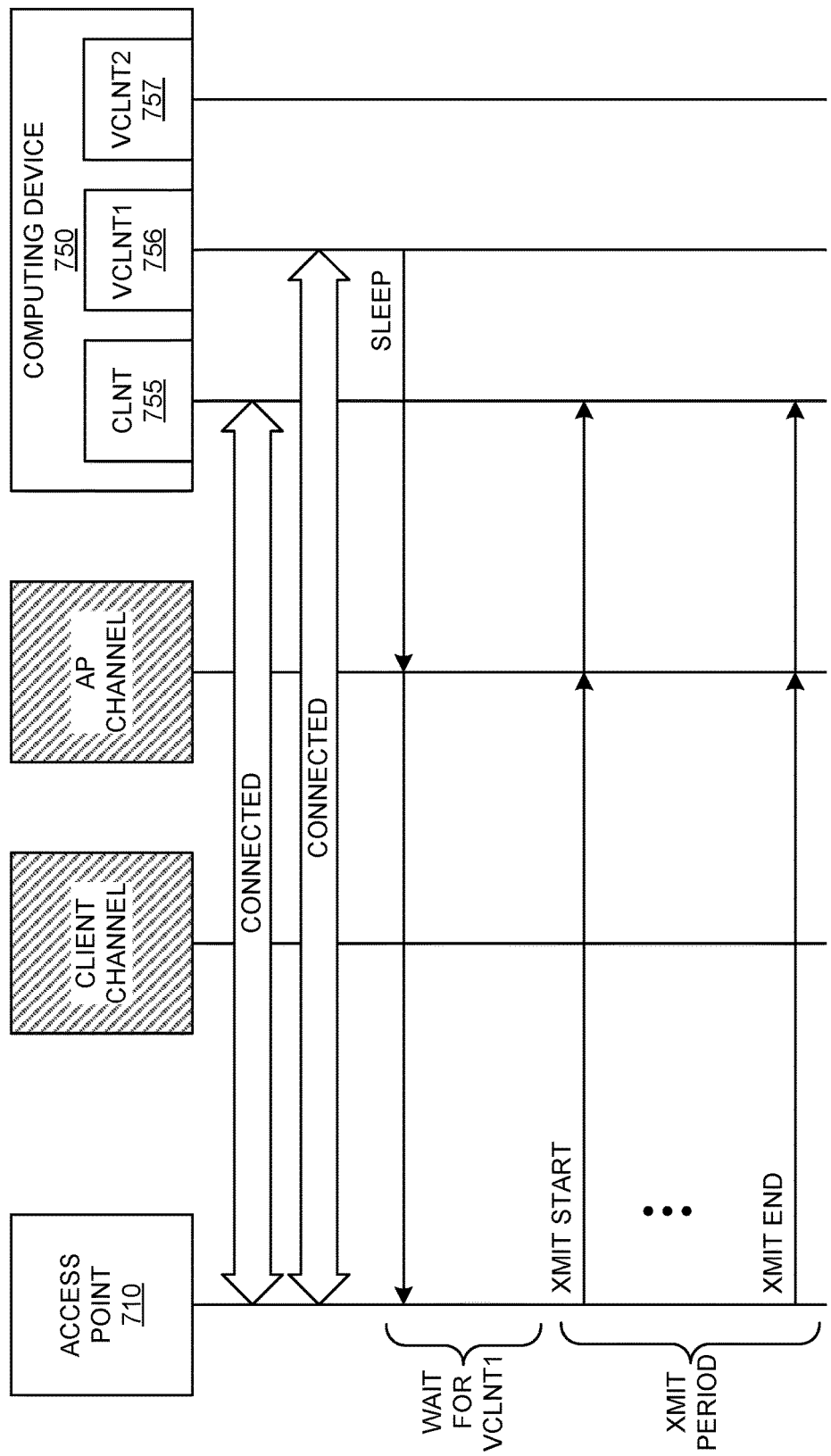
FIG. 14 is a diagram that illustrates setting a broadcast/multicast transmission time.

FIG. 14 is a diagram that illustrates setting a broadcast/multicast transmission time. The processes illustrated in FIG. 13 may be performed by one or more elements of communication system 100 and/or communication system 700. At the start of the diagram, 'real' client 755 of computing device 750 and 'virtual' client 756 are connected to Wi-Fi access point 710. Virtual client 757, however, is not (and normally will never be) connected to Wi-Fi access point 710. Virtual client 756 of computing device 750 sends a power save (or 'sleep') indicator message to Wi-Fi access point 710 via the AP channel. Computing device 750 has client 756 send this indicator message to Wi-Fi access point 710 so that virtual client 756 will appear 'asleep' to Wi-Fi access point 710. Computing device 750 times the sending of this indicator message to Wi-Fi access point 710 so that virtual client 756 will only appear 'awake to Wi-Fi access point 710 around time that Wi-Fi access point 710 will be sending a beacon frame. Since broadcast/multicast frames are only sent when all the clients connected to Wi-Fi access point 710 (i.e., client 755 and virtual client 756) are awake, broadcast/multicast frames are confined to being sent during the 'awake' times of virtual client 756. Thus, the sleep/wake times of virtual client 756 can be used to control when broadcast/multicast frames are sent by Wi-Fi access point 710.

After receiving the power save message from virtual client 756, Wi-Fi access point 710 waits for the 'media busy' time set by virtual client 756 to expire. When the time set by virtual client 756 expires, Wi-Fi access point 710 can send broadcast/multicast frames to computing device 750 (and client 755 of computing device 750, in particular) via the AP channel.

Figure 15:
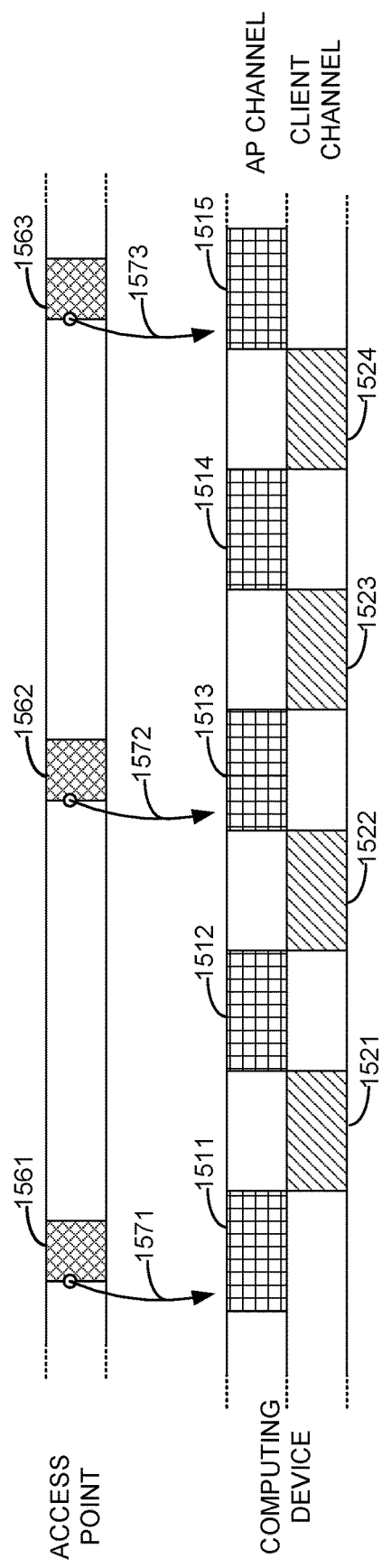
FIG. 15 is a diagram illustrating time allocations to receive beacon transmissions.

FIG. 15 is a diagram illustrating time allocations to receive beacon transmissions. In FIG. 15, beacon transmissions 1561, 1562, and 1563 by Wi-Fi access point 710 are illustrated. In addition, AP channel allocations 1511, 1512, 1513, 1514, and 1515, and client channel allocations 1521, 1522, 1523, and 1524 are illustrated. In FIG. 15, AP allocations AP channel allocations 1511, 1512, 1513, 1514, and 1515, alternate with, but do not overlap in time, client channel allocations 1521, 1522, 1523, and 1524. AP allocations 1511, 1513, and 1515, however, are timed so that computing device 750 can receive beacon transmissions 1561, 1562, and 1563. This is illustrated in FIG. 15, respectively, by arrow 1571 between beacon 1561 and allocation 1511, arrow 1572 between beacon 1562 and allocation 1513, and arrow 1573 between beacon 1563 and allocation 1515.

Figure 16:
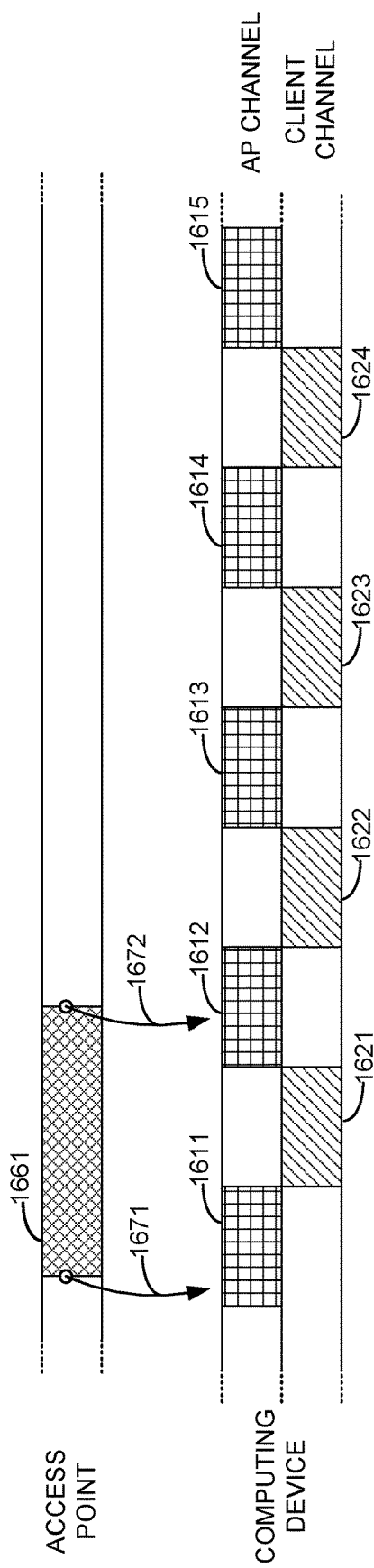
FIG. 16 is a diagram illustrating an aggregated frame transmission.

FIG. 16 is a diagram illustrating an aggregated frame transmission. In FIG. 1165, aggregated frame transmission 1661 by Wi-Fi access point 710 is illustrated. In addition, AP channel allocations 1611, 1612, 1613, 1614, and 1615, and client channel allocations 1621, 1622, 1623, and 1624 are illustrated. In FIG. 16, AP allocations AP channel allocations 1611, 1612, 1613, 1614, and 1615, alternate with, but do not overlap in time, client channel allocations 1621, 1622, 1623, and 1624. Aggregated frame transmission 1661, however, begins during AP channel allocation 1611, continues through client allocation 1621, and ends during AP channel allocation 1612. Thus, since access point was transmitting during the entire time computing device 750 was operating on the client channel, computing device 750 does not miss any data from Wi-Fi access point 710.

Figure 17:
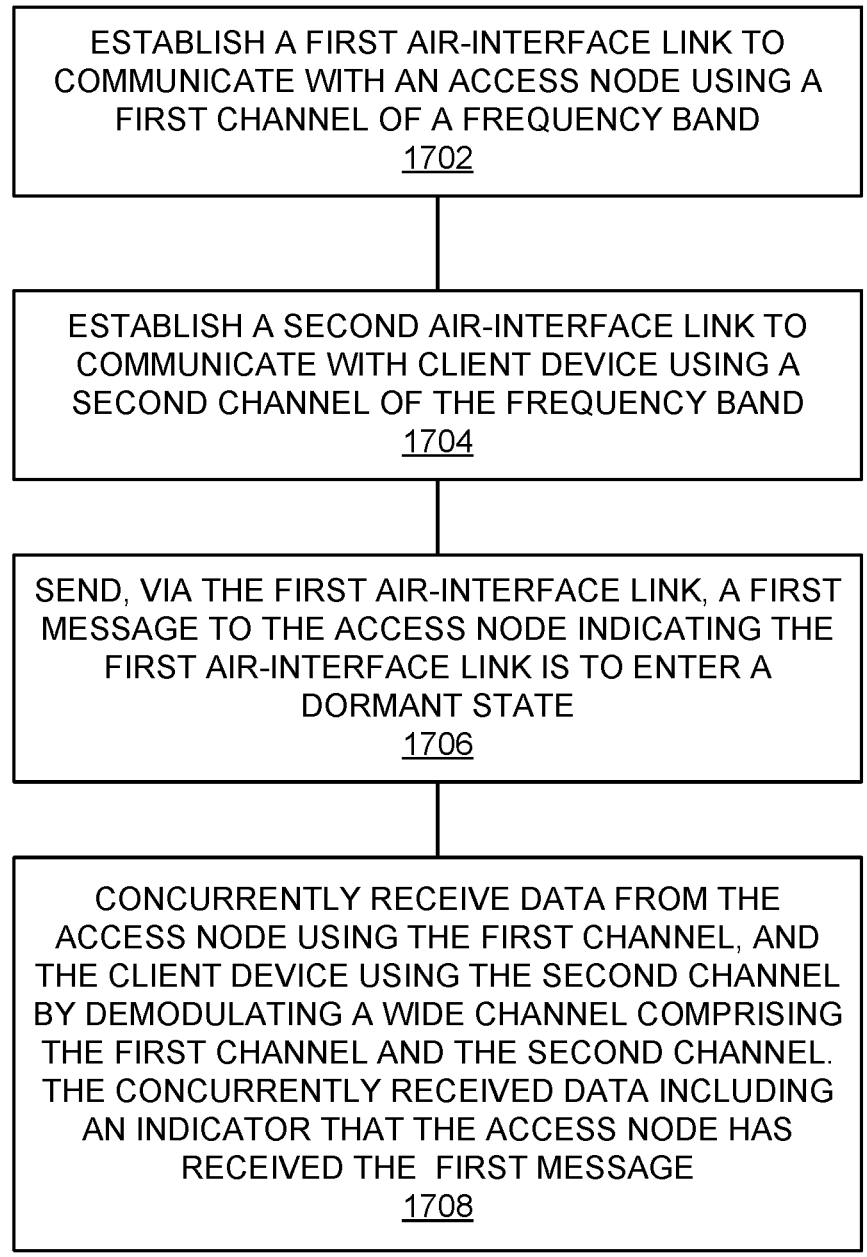
FIG. 17 is a flowchart illustrating a method of operating a communication system.

FIG. 17 is a flowchart illustrating a method of operating a communication system. The steps illustrated in FIG. 17 may be performed by one or more elements of communication system 100 and/or communication system 700. A first wireless interface link is established to communicate with an access node using a first channel of a frequency band (1702). For example, computing device 750 may establish link 741 with Wi-Fi access point 710 using a channel designated as the AP channel. The AP channel is specified as one of a plurality of channels of a country dependent Wi-Fi frequency band. A second wireless interface link is established to communicate with a client device using a second channel of the frequency band (1702). For example, computing device 750 may establish link 742 with client device 730 using a channel designated, by computing device 750, as the client channel. Like the AP channel, the client channel is specified as one of a plurality of channels of a country dependent Wi-Fi frequency band.

Via the first wireless interface link, a first message to the access node indicating the first wireless interface link is to enter a dormant state is sent (1706). For example, computing device 750 may send, to Wi-Fi access point 710, a power save indicator informing Wi-Fi access point 710 that computing device 750 will not be in communication for a period of time.

Data from the access node via the first channel and data from the client device via the second channel is concurrently received by demodulating a wide channel comprising the first channel and the second channel. The concurrently received data including an indicator that the access node has received the first message (1708). For example, radio 751 may be configured to receive, demodulate, separate, and decode the OFDM carriers of the AP channel and the client channel as described herein (e.g., by demodulating a 40 MHz channel comprising two 20 MHz channels.) This allows computing device 750 to monitor the AP channel for an acknowledgement from Wi-Fi access point 710, and to monitor the client channel for a communication from a client device 730.

Figure 18:
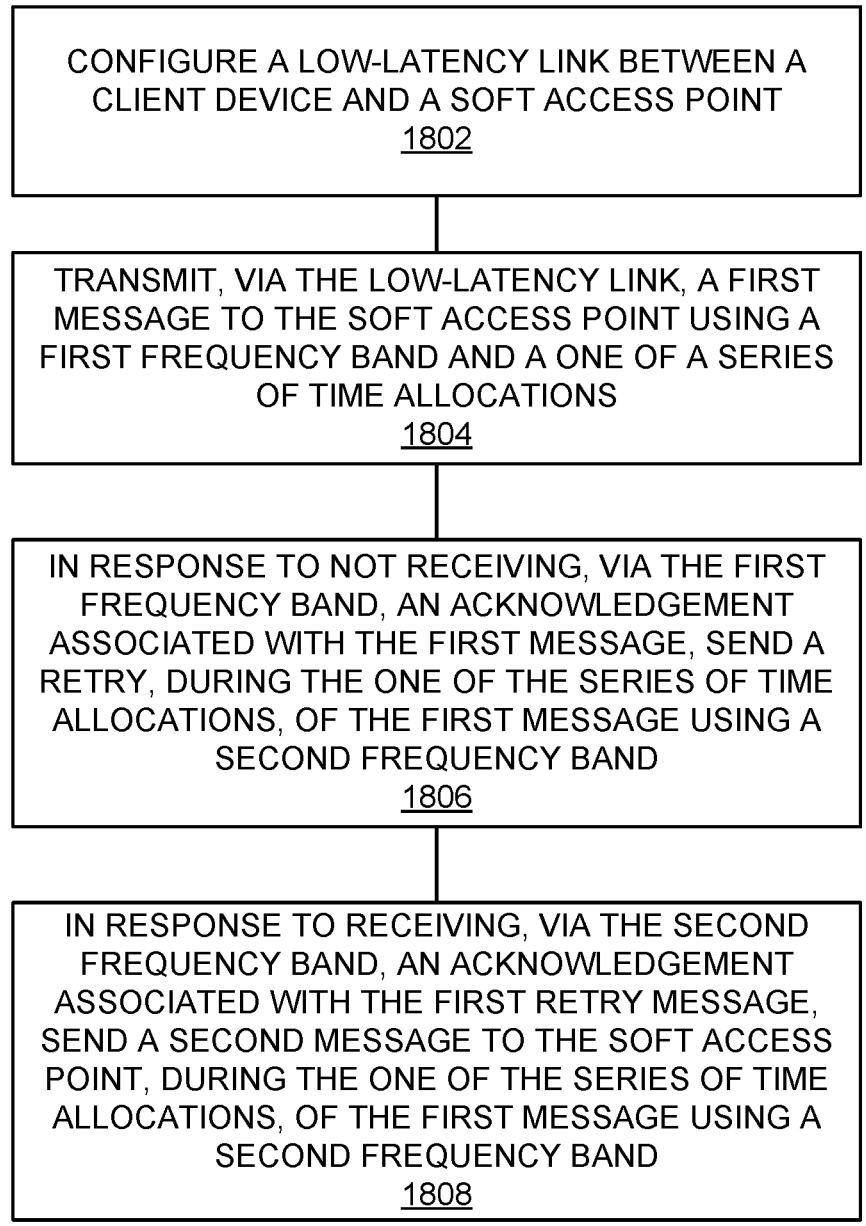
FIG. 18 is a flowchart illustrating a method of operating a client device.

FIG. 18 is a flowchart illustrating a method of operating a client device. The steps illustrated in FIG. 18 may be performed by one or more elements of communication system 100 and/or communication system 700. A low-latency link between a client device and a soft access point is configured (1802). In an embodiment, the low-latency link uses a first frequency band and a first series of time allocations while a second (e.g., high-throughput) link uses a second frequency band and a second series of time allocations. For example, client device 730 and computing device 750 may be configured to communicate via link 742 while computing device 750 and Wi-Fi access point 710 are configured to communicate via link 741.

Via the low-latency link, a first message to the soft access point using the first frequency band and a one of a series of time allocations is sent (1804). For example, client device 730 may send a Wi-Fi frame to computing device 750 using the client channel during a time allocation designated for operating on the client channel.

In response to not receiving, via the first frequency band, an acknowledgement associated with the first message, a retry of the first message using a second frequency band and during the one of the series of time allocations is sent (1806). For example, in response to not receiving an acknowledgement of the client channel, client device 730 may send a retry of the Wi-Fi frame, during the time allocation designated for operating on the client channel, to computing device 750, using the AP channel.

In response to receiving, via the second frequency band, an acknowledgement associated with the retry of the first message, a second message to the soft access point is sent using the second frequency band and is sent during the one of the series of time allocations (1808). For example, client device 730 may send, in response to receiving an acknowledgement of the retry frame, additional messages/data during the time allocation designated for operating on the client channel, to computing device 750, using the AP channel.

Figure 19:
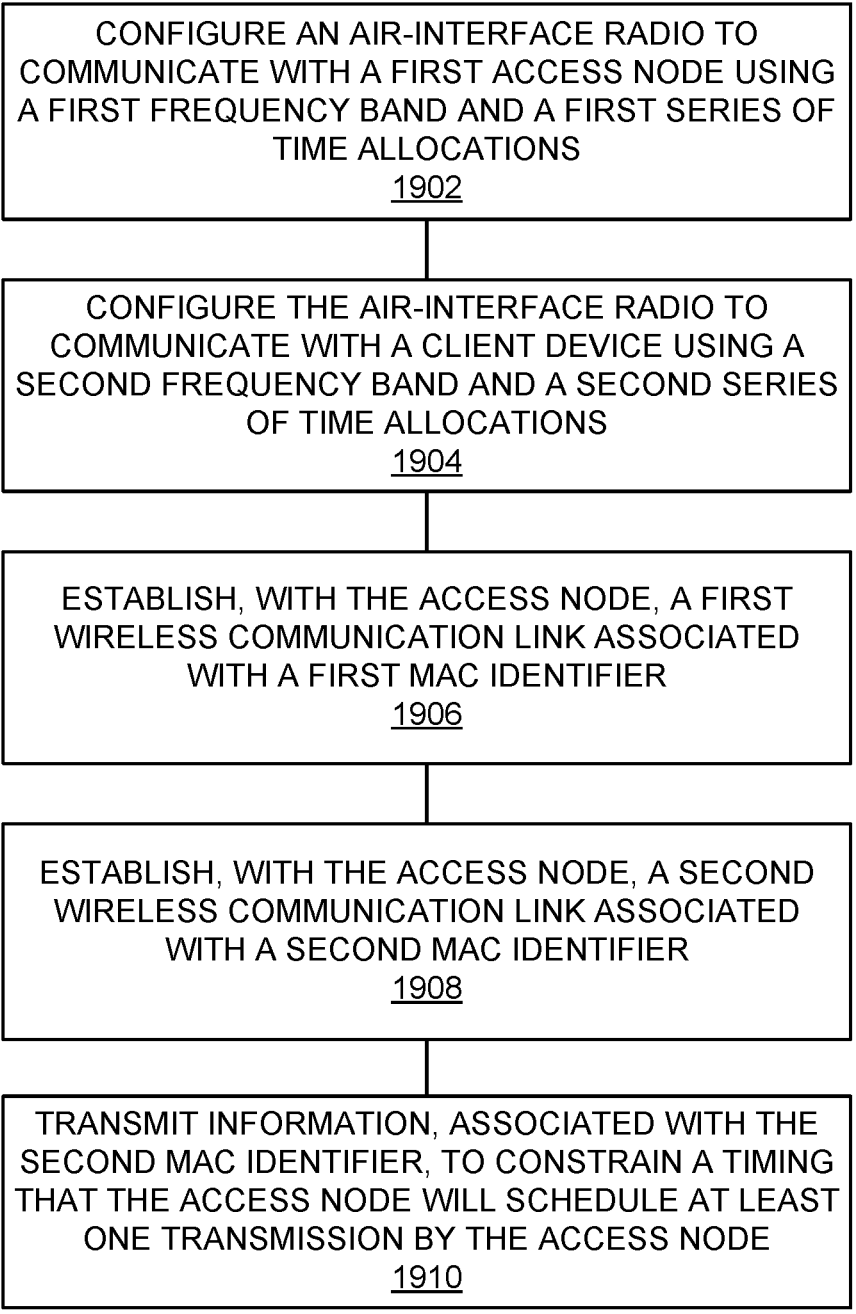
FIG. 19 is a flowchart illustrating a method of using a connected virtual client to constrain access point transmission timing.

FIG. 19 is a flowchart illustrating a method of using a connected virtual client to constrain access point transmission timing. The steps illustrated in FIG. 19 may be performed by one or more elements of communication system 100 and/or communication system 700. A wireless interface radio is configured to communicate with a first access node using a first frequency band and a first series of time allocations (1902). For example, radio 751 of computing device 750 may be configure by computing device 750 to communicate with Wi-Fi access point 710 using the AP channel during time allocations designated for operating using the AP channel.

The wireless interface radio is configured to communicate with a client device using a second frequency band and a second series of time allocations (1904). For example, radio 751 of computing device 750 may be configured by computing device 750 to communicate with Wi-Fi device 730 using the client channel during time allocations designated for operating using the client channel.

With the access node, a first wireless communication link associated with a first MAC identifier is established (1906). For example, computing device 750 may establish a connection for client 755 with Wi-Fi access point 710. With the access node, a second wireless communication link associated with a second MAC identifier is established (1908). For example, computing device 750 may establish a connection for virtual client 756 with Wi-Fi access point 710.

Information to constrain a timing that the access node will schedule at least one transmission is transmitted associated to the second MAC identifier (1910). For example, computing device 750 may have radio 751 make a transmission that is identified as coming from virtual client 756. This transmission can set sleep/wake parameters used by Wi-Fi access point 710 to determine when to send certain transmissions (e.g., broadcast/multicast transmissions). By setting these parameters with the transmission that was identified as coming from virtual client 756, computing device 750 can constrain the timing of future transmissions by Wi-Fi access point 710.

Figure 20:
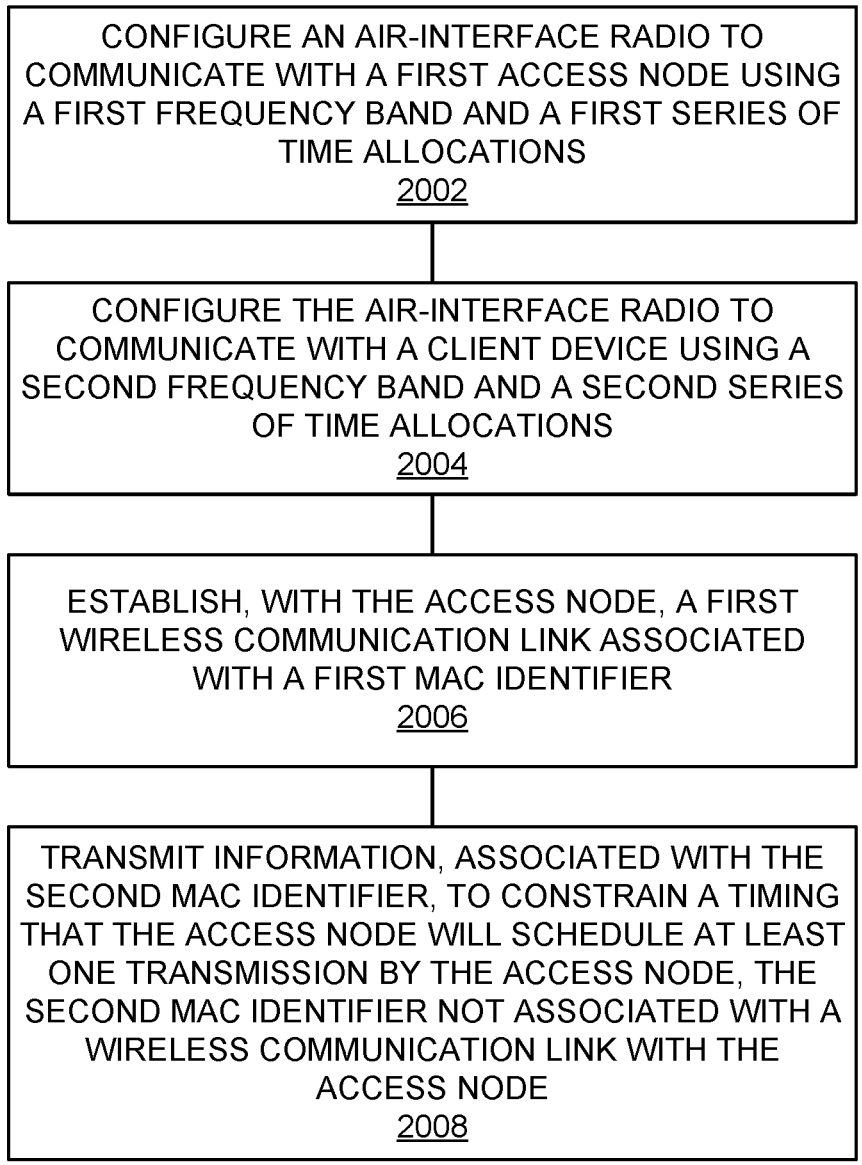
FIG. 20 is a flowchart illustrating a method of using a non-connected virtual client to constrain access point transmission timing.

FIG. 20 is a flowchart illustrating a method of using a connected virtual client to constrain access point transmission timing. The steps illustrated in FIG. 20 may be performed by one or more elements of communication system 100 and/or communication system 700. A wireless interface radio is configured to communicate with a first access node using a first frequency band and a first series of time allocations (2002). For example, radio 751 of computing device 750 may be configured by computing device 750 to communicate with Wi-Fi access point 710 using the AP channel during time allocations designated for operating using the AP channel.

The wireless interface radio is configured to communicate with a client device using a second frequency band and a second series of time allocations (2004). For example, radio 751 of computing device 750 may be configure by computing device 750 to communicate with Wi-Fi device 730 using the client channel during time allocations designated for operating using the client channel.

With the access node, a first wireless communication link associated with a first MAC identifier is established (2006). For example, computing device 750 may establish a connection for client 755 with Wi-Fi access point 710.

Information to constrain a timing that the access node will schedule at least one transmission is transmitted associated to a second MAC identifier that is not associated with a wireless communication link with the access node (2008). For example, computing device 750 may have radio 751 make a transmission that is identified as coming from virtual client 757. This transmission can set busy/free parameters used by Wi-Fi access point 710 that determine when to send certain transmissions (e.g., broadcast/multicast transmissions). By setting these parameters with the transmission that was identified as coming from virtual client 757, computing device 750 can constrain the timing of future transmissions by Wi-Fi access point 710.

Many of the functions, protocols, etc. described above may be implemented with, contain, or be executed by one or more computer systems, processing circuits, hardware state machines, or other circuit blocks and/or circuit partitions. The methods described above may also be stored on a non-transitory computer readable medium and/or implemented by state machines. Many of the elements of communication system 100, and/or communication system 700 may be, comprise, or include wireless capable devices and/or nodes. This includes, but is not limited to: wireless network access node 110, client device 130, computing device 150, Wi-Fi access node 710, client device 730, client device 731, and/or computing device 750.

Figure 21:
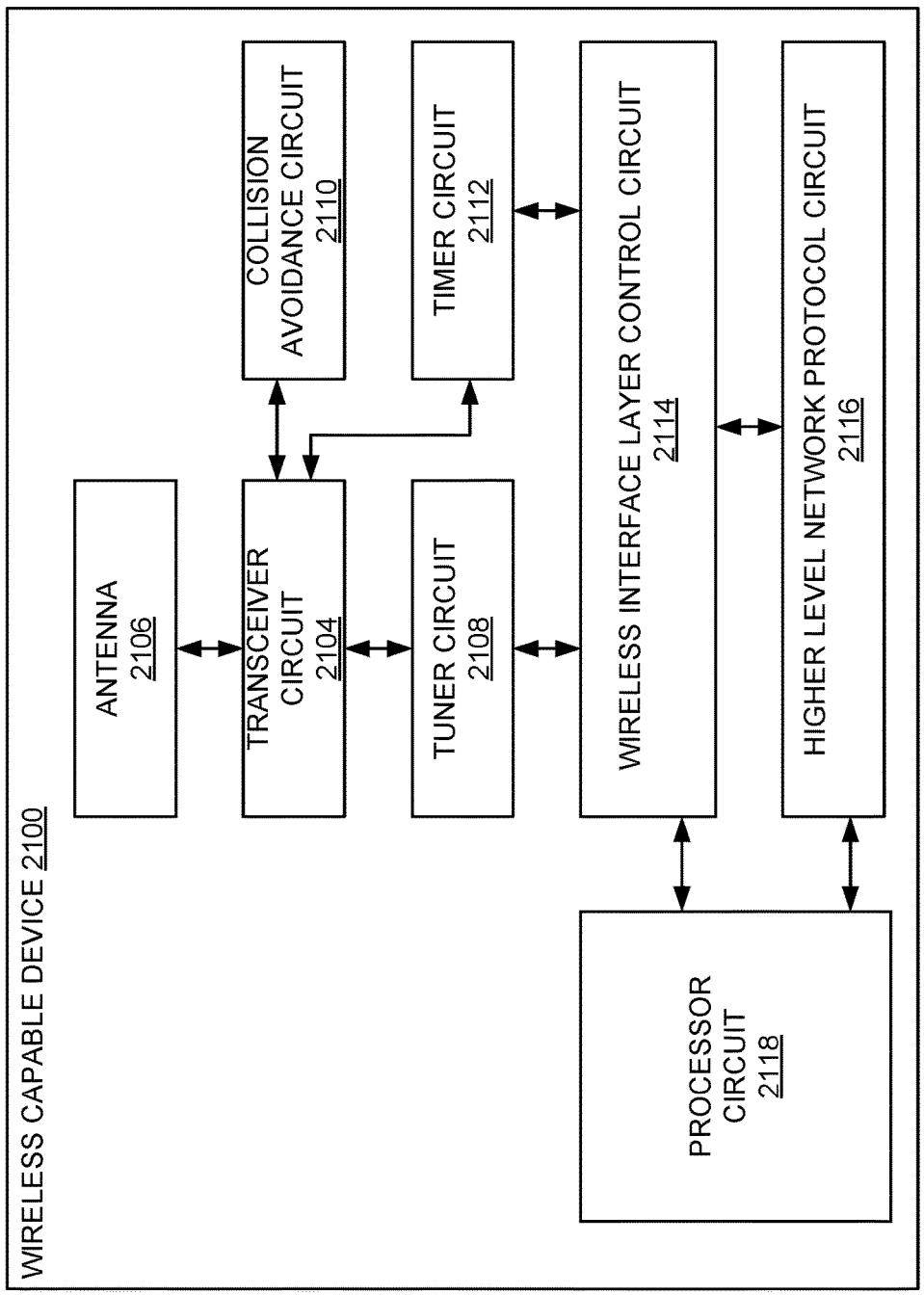
FIG. 21 is a block diagram of an example device with wireless capability.

FIG. 21 is a block diagram illustrating portions of an example wireless capable device. Wireless capable device 2100 comprises antenna 2106, transceiver circuit 2104, collision avoidance circuit 2110, tuner circuit 2108, timer circuit 2112, wireless interface layer control circuit 2114, higher level network protocol circuit 2116, and processor 2118. antenna 2106, transceiver circuit 2104, collision avoidance circuit 2110, tuner circuit 2108, timer circuit 2112, wireless interface layer control circuit 2114 may cooperate to implement one or more of the lower layers (e.g., physical layer 1) of the Open Systems Interconnect (OSI) model and the additional or modified functions associated with that layer described herein. Processor 2118 and higher level network protocol circuit 2116 may cooperate to implement one or more of the higher layers (e.g., MAC or IP layer) of the Open Systems Interconnect and the additional or modified functions of those layers described herein.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of wireless network access node 110, client device 130, computing device 150, Wi-Fi access node 710, client device 730, client device 731, and/or computing device 750, communication system 100, and/or communication system 700, and their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Figure 22:
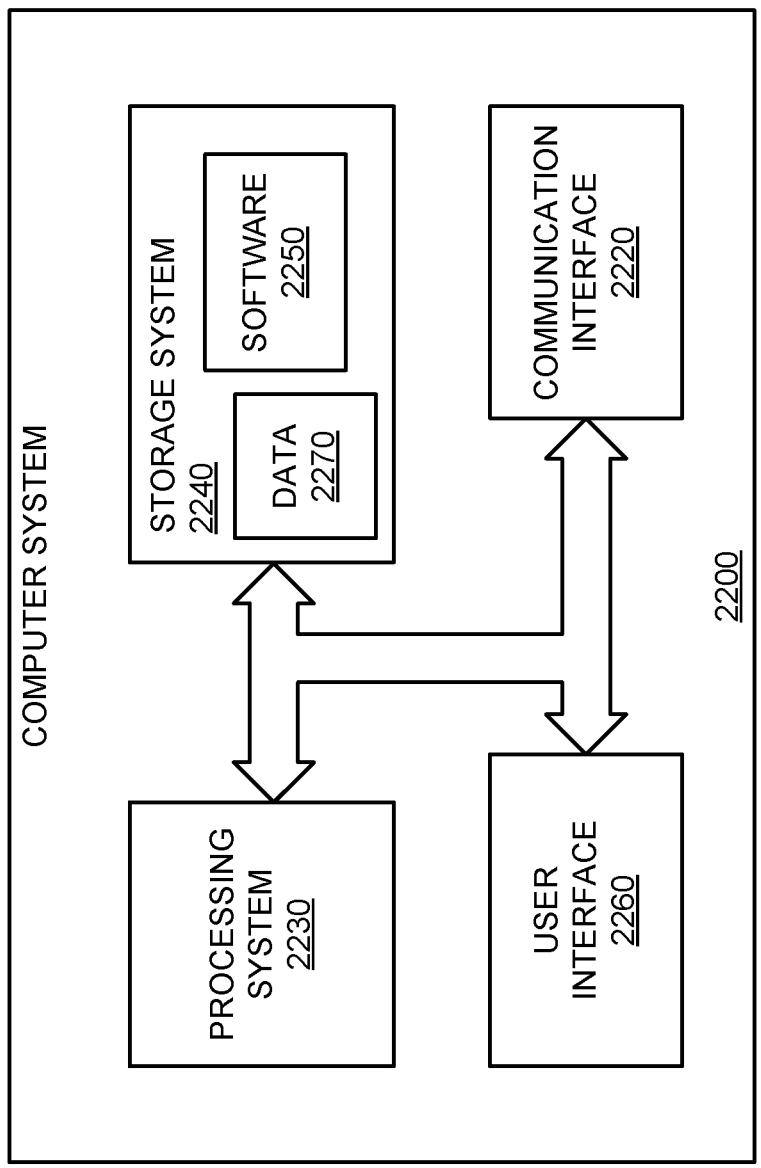
FIG. 22 is a block diagram of an example computer system.

FIG. 22 illustrates a block diagram of an example computer system. Computer system 2200 includes communication interface 2220, processing system 2230, storage system 2240, and user interface 2260. Processing system 2230 is operatively coupled to storage system 2240. Storage system 2240 stores software 2250 and data 2270. Processing system 2230 is operatively coupled to communication interface 2220 and user interface 2260. Computer system 2200 may comprise a programmed general-purpose computer. Computer system 2200 may include a microprocessor. Computer system 2200 may comprise programmable or special purpose circuitry. Computer system 2200 may be distributed among multiple devices, processors, storage, and/or interfaces that together comprise elements 2220-2270.

Communication interface 2220 may comprise a network interface, modem, port, bus, link, transceiver, or other communication device. Communication interface 2220 may be distributed among multiple communication devices. Processing system 2230 may comprise a microprocessor, microcontroller, logic circuit, or other processing device. Processing system 2230 may be distributed among multiple processing devices. User interface 2260 may comprise a keyboard, mouse, voice recognition interface, microphone and speakers, graphical display, touch screen, or other type of user interface device. User interface 2260 may be distributed among multiple interface devices. Storage system 2240 may comprise a disk, tape, integrated circuit, RAM, ROM, EEPROM, flash memory, network storage, server, or other memory function. Storage system 2240 may include computer readable medium. Storage system 2240 may be distributed among multiple memory devices.

Processing system 2230 retrieves and executes software 2250 from storage system 2240. Processing system 2230 may retrieve and store data 2270. Processing system 2230 may also retrieve and store data via communication interface 2220. Processing system 2250 may create or modify software 2250 or data 2270 to achieve a tangible result. Processing system may control communication interface 2220 or user interface 2260 to achieve a tangible result. Processing system 2230 may retrieve and execute remotely stored software via communication interface 2220.

Software 2250 and remotely stored software may comprise an operating system, utilities, drivers, networking software, and other software typically executed by a computer system. Software 2250 may comprise an application program, applet, firmware, or other form of machine-readable processing instructions typically executed by a computer system. When executed by processing system 2230, software 2250 or remotely stored software may direct computer system 2200 to operate as described herein.

In an embodiment, a method of operating a communication system, includes: configuring a wireless interface radio to communicate with an access node using a first frequency band and a first series of time allocations; configuring the wireless interface radio to communicate with at least one client device using a second frequency band and a second series of time allocations, the first series of time allocations and the second series of time allocations to be non-overlapping; and, sending, via the second frequency band and to at least one client device, information to be used by the at least one client device to select a time to transmit using the second frequency band; and, based on a transmission received via the wireless interface radio, altering a first duration of a first time allocation of at least one of the first series of time allocations and the second series of time allocations.

The transmission may be received using the first frequency band. The first time allocation may be from the first series of time allocations. The first duration of the first time allocation may be increased in response to the transmission received using the first frequency band. A second duration of a second time allocation from the second series of time allocations may be decreased in response to the transmission received using the first frequency band.

The transmission may be received using the second frequency band where the first time allocation is from the second series of time allocations, and the duration of the first time allocation is increased in response to the transmission received using the second frequency band. A second duration of a second time allocation from the first series of time allocations may be decreased in response to the transmission received using the second frequency band.

In an embodiment, a method of operating a communication system, includes: configuring a high-throughput link that uses a wireless interface radio to communicate with an access node using a first frequency band and a first series of time allocations; configuring a low-latency link that uses the wireless interface radio to communicate with at least one client device using a second frequency band and a second series of time allocations, the first series of time allocations and the second series of time allocations to be non-overlapping; and, sending, to a first client device communicating via the second frequency band, a first time indicator, the first client device to, in response to the first time indicator, select a first time to transmit that is during a one of the second series of time allocations. The first time indicator may correspond to a time that is referenced with respect to a boundary between time allocations of the first series of time allocations and the second series of time allocations.

This method may also include sending, to a second client device communicating via the second frequency band, a second time indicator, the second client device to, in response to the second time indicator, select a second time to transmit that is during a one of the second series of time allocations and does not collide with the first time to transmit selected by the first client device.

This method may also include altering, based on a transmission received from the first client device, a first duration of a first time allocation of at least one of the first series of time allocations and the second series of time allocations. In response to the transmission received from the first client device, the first duration may be increased by a first amount. In response to the transmission received from the first client device, a second time allocation of following the first time allocation may be decreased by the first amount. The second time allocation may belong to the second series of time allocations.

In an embodiment a wireless capable device comprises a wireless interface radio to communicate with a first device using a first frequency band and a first series of time allocations. This first frequency band and first series of time allocations are to be used as a high-throughput link. The wireless interface radio is to also communicate with at least a second device using a second frequency band and a second series of time allocations. This second frequency band and second series of time allocations to be used as a low-latency link. The first series of time allocations and the second series of time allocations are to be non-overlapping. The wireless capable device also comprises a wireless interface layer control circuit to control the wireless interface radio. The wireless interface layer control circuit is to control the wireless interface radio to send, to the second device communicating via the second frequency band, a first time indicator. The second device is to, in response to the first time indicator, select a first time to transmit that is during a one of the second series of time allocations.

The first device may be an access node. The second device may be a client device. The first time indicator may correspond to a time that is referenced with respect to a boundary between time allocations of the first series of time allocations and the second series of time allocations. The wireless interface layer control circuit may also control the wireless interface radio to send, to a third device communicating via the second frequency band, a second time indicator. The second client device is to, in response to the second time indicator, select a second time to transmit that is during a one of the second series of time allocations and does not collide with the first time to transmit selected by the second device.

Based on a transmission received from the second device, the wireless device may alter a first duration of a first time allocation of at least one of the first series of time allocations and the second series of time allocations. In response to the transmission received from the second device, the wireless device may increase the first duration by a first amount. In response to the transmission received from the second device, the wireless device may decrease a second time allocation that follows the first time allocation by the first amount. The second time allocation may belong to the second series of time allocations.

In an embodiment, a method of operating a client device includes: configuring a low-latency link between the client device and an access point, the low-latency link to use a first frequency band and a first series of time allocations, the access point to communicate with a network access node using a second frequency band and a second series of time allocations, the first series of time allocations and the second series of time allocations to be non-overlapping; receiving, from the access point and via the low-latency link, a first time indicator; and, in response to the time indicator, configuring the client device to select a first selected transmit time that is during a first one of the first series of time allocations. The first time indicator may correspond to a time that is referenced with respect to a boundary between time allocations of the first series of time allocations and the second series of time allocations.

This method may also include sending, to a second client device communicating via the second frequency band, a second time indicator, the second client device to, in response to the second time indicator, select a second time to transmit that is during a one of the second series of time allocations and does not collide with the first time to transmit selected by the first client device.

This method may also include, altering, based on a transmission received from the first client device, a first duration of a first time allocation of at least one of the first series of time allocations and the second series of time allocations. In response to the transmission received from the first client device, the first duration may be increased by a first amount. In response to the transmission received from the first client device, a second time allocation following the first time allocation may be decreased by the first amount. The second time allocation may belong to the second series of time allocations.

In an embodiment, a method of operating a client device includes configuring a low-latency link between the client device and a wireless interface of a computing device, the low-latency link to use a first frequency band and a first series of time allocations, the wireless interface to communicate with a network access node using a second frequency band and a second series of time allocations, the first series of time allocations and the second series of time allocations to be non-overlapping; receiving, from the wireless interface and via the low-latency link, a first time indicator; and, in response to the time indicator, configuring the client device to select a first selected transmit time that is during a first one of the first series of time allocations.

This method may also include detecting that another device is transmitting at the first selected transmit time; and, in response to detecting that another device is transmitting at the selected transmit time, selecting a second transmit time. The second transmit time may be selected according to a wireless standard specified collision avoidance algorithm performed by the client device. The second transmit time may be selected to be during the first one of the first series of time allocations. The second transmit time may be selected to be during a second one of the first series of time allocations. The first time indicator may correspond to a time that is referenced with respect to a boundary between time allocations of the first series of time allocations and the second series of time allocations.

In an embodiment, a method of operating a communication system, includes: establishing a first wireless interface link to communicate with an access node using a first channel of a frequency band; establishing a second wireless interface link to communicate with a client device using a second channel of the frequency band; sending, via the first wireless interface link, a first message to the access node indicating the first wireless interface link is to enter a first dormant state; and, concurrently receiving data from the access node using the first channel and the client device using the second channel by demodulating a wide channel comprising the first channel and the second channel, the concurrently received data including an indicator that the access node has received the first message indicating the first wireless interface link is to enter the first dormant state. The indicator that the access node has received the first message may be received via the first channel. The concurrently received data may include a second indicator that the client device has exited a second dormant state where this second indicator is received via the second channel.

The concurrently received data may include an indicator that the client device has exited a second dormant state. The indicator that the client device has exited the second dormant state may be received via the first channel. The indicator that the client device has exited the second dormant state may be received via the second channel.

This method may also include concurrently sending a second message to the access node and a third message to the client device, the second message being sent using the first channel and the third message being sent using the second channel, the first message indicating to the access point that the first message is to keep the first channel busy for an indicated period of time, the second message to be sent to the client device using the second channel during the indicated period of time. The concurrently received data may include an indicator that the client device is requesting to communicate via the second link, and the third message is a response to the request to communicate via the second link.

In an embodiment, a method of operating a client device, including: configuring a low-latency link between the client device and a soft access point device, the low-latency link to use a first frequency band and a first series of time allocations, the soft access point device to also communicate with a network access node using a second frequency band and a second series of time allocations, the first series of time allocations and the second series of time allocations to be non-overlapping; transmitting, via the low-latency link, a first message to the soft access point using the first frequency band during a first one of the first series of time allocations; in response to not receiving, via the first frequency band, a first acknowledgement associated with the first message, sending a first retry of the first message to the soft access point using the second frequency band during the first one of the first series of time allocations; and, in response to receiving, via the second frequency band, a second acknowledgment associated with the first retry of the first message, sending a second message to the soft access point using the second frequency band during the first one the first series of time allocations.

This method may also: send, in response to not receiving the second acknowledgement associated with the retry of the first message, a second retry of the first message to the soft access point using the first frequency band during the first one of the first series of time allocations; and, in response to receiving, via the first frequency band, a second acknowledgment associated with the second retry of the first message, send a third message to the soft access point using the first frequency band during the first one of the first series of time allocations.

In an embodiment, a method of operating a communication system, including: configuring a wireless interface radio to communicate with a first access node using a first frequency band and a first series of time allocations; configuring the wireless interface radio to communicate with at least one client device using a second frequency band and a second series of time allocations, the first series of time allocations and the second series of time allocations to be non-overlapping; establishing, with the access node, a first wireless communication link associated with first media access control (MAC) identifier; establishing, with the access node, a second wireless communication link associated with a second MAC identifier; and, transmitting information, associated with the second MAC identifier, to constrain a timing that the access node will schedule at least one transmission by the access node.

The transmitted information associated with the second MAC identifier can prevent a transmission by the access node that would start during a one of second series of time allocations but not end before an end of the one of the second series of time allocations. The transmitted information may constrain the timing that the access node schedules a broadcast frame. The transmitted information may constrain the timing that the access node schedules a multicast frame. The transmitted information associated with the third MAC identifier can prevent a transmission by the access node during a period of time that the wireless interface radio is to communicate with at least one client device using the second frequency band.

This method may also transmit information, associated with a third MAC identifier, to constrain a timing that the access node will schedule at least one transmission by the access node, where the second MAC identifier is not associated with a wireless communication link with the access node.

This method may also receive, from a client device and via the first frequency band and during a one of the second series of time allocations, a retry of a first message that was previously sent by the client device using the second frequency band during the one of the second series of time allocations. This method may also transmit, to the client device and via the first frequency band and during the one of the second series of time allocations, a response to the retry of the first message.

In an embodiment, a wireless capable device comprises a wireless interface radio to communicate with an access node using a first frequency band and a first series of time allocations. The first frequency band and first series of time allocations are to be used as a high-throughput link. The wireless interface radio is to also communicate with at least one client device using a second frequency band and a second series of time allocations. The second frequency band and a second series of time allocations are to be used as a low-latency link. The first series of time allocations and the second series of time allocations are to be non-overlapping. The wireless capable device also comprises a wireless interface layer control circuit to establish, with the access node, a first wireless communication link associated with first media access control (MAC) identifier. The wireless interface layer control circuit to also establish, with the access node, a second wireless communication link associated with a second MAC identifier. The wireless interface radio to also transmit information associated with the second MAC identifier to constrain a timing that the access node will schedule at least one transmission by the access node.

The transmitted information associated with the second MAC identifier may prevent a transmission by the access node that would start during a one of second series of time allocations, but not end before an end of the one of the second series of time allocations. The transmitted information associated with the second MAC identifier may constrain the timing that the access node schedules a broadcast frame. The transmitted information associated with the second MAC identifier may constrain the timing that the access node schedules a multicast frame.

The wireless interface radio may also transmit information associated with a third MAC identifier to constrain a timing that the access node will schedule at least one transmission by the access node where the second MAC identifier is not associated with a wireless communication link with the access node. The transmitted information associated with the third MAC identifier may prevent a transmission by the access node during a period of time that the wireless interface radio is to communicate with at least one client device using the second frequency band. The wireless interface radio may also receive, from a client device and via the first frequency band and during a one of the second series of time allocations, a retry of a first message that was previously sent by the client device using the second frequency band during the one of the second series of time allocations. The wireless interface radio may also transmit, to the client device and via the first frequency band and during the one of the second series of time allocations, a response to the retry of the first message.

In an embodiment, a method of operating a communication system, includes: configuring a wireless interface radio to communicate with a first access node using a first frequency band and a first series of time allocations; configuring the wireless interface radio to communicate with at least one client device using a second frequency band and a second series of time allocations, the first series of time allocations and the second series of time allocations to be non-overlapping; establishing, with the access node, a first wireless communication link associated with first media access control (MAC) identifier; and, transmitting information, associated with a second MAC identifier, to constrain a timing that the access node will schedule at least one transmission by the access node, the second MAC identifier not associated with a wireless communication link with the access node.

The transmitted information associated with the second MAC identifier can prevent a transmission by the access node during a period of time that the wireless interface radio is to communicate with at least one client device using the second frequency band. The transmitted information may constrain the timing that the access node schedules a broadcast frame. The transmitted information may constrain the timing that the access node schedules a multicast frame.

This method may also receive, from a client device and via the first frequency band and during a one of the second series of time allocations, a retry of a first message that was previously sent by the client device using the second frequency band during the one of the second series of time allocations. This method may also transmit, to the client device and via the first frequency band and during the one of the second series of time allocations, a response to the retry of the first message.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of operating a communication system, comprising:
    configuring a wireless interface radio to implement a combination of frequency division multiplexing (FDM) and time division multiplexing (TDM) by
    configuring the wireless interface radio to communicate with an access node using a first frequency band and a first series of time allocations, and
    configuring the wireless interface radio to communicate with at least one client device using a second frequency band and a second series of time allocations, the first series of time allocations and the second series of time allocations to be non-overlapping;
    sending, via the second frequency band and to at least one client device, information to be used by the at least one client device to select a time to transmit using the second frequency band; and,
    in response to a transmission from the access node and on the first frequency band, received via the wireless interface radio during a current time allocation in the first series of time allocations that begins during the current time allocation in the first series of time allocations and is expected to not complete before a scheduled end of the current time allocation in the first series of time allocations, dynamically altering a duration of the current time allocation in the first series of time allocations to complete reception of the transmission during the current time allocation in the first series of time allocations and also dynamically altering a duration of a subsequent time allocation in the second series of time allocations.

2. The method of claim 1, wherein the duration of the current time allocation is increased in response to the transmission received using the first frequency band.

3. The method of claim 2, wherein the duration of the subsequent time allocation in the second series of time allocations is decreased in response to the transmission received using the first frequency band.

4. The method of claim 1, further comprising
    in response to another transmission from a client device and on the second frequency band, received via the wireless interface radio during a selected time allocation in the second series of time allocations that begins during the selected time allocation in the second series of time allocations and is not expected to complete before a scheduled end of the selected time allocation in the second series of time allocations, increasing a duration of the selected time allocation in the second series of time allocations.

5. The method of claim 4, wherein the duration of a selected time allocation in the first series of time allocations is decreased in response to the other transmission received from the client device using the second frequency band.

6. A wireless device, comprising:
    a wireless interface radio configured to implement a combination of frequency division multiplexing (FDM) and time division multiplexing (TDM) to communicate with a first device using a first frequency band and a first series of time allocations that are to be used as a high-throughput link, and to also communicate with at least a second device using a second frequency band and a second series of time allocations to be used as a low-latency link, the first series of time allocations and the second series of time allocations to be non-overlapping; and
    a wireless interface layer control circuit to control the wireless interface radio to send, to the second device communicating via the second frequency band, a first time indicator usable by the second device to select a first time to transmit that is during a time allocation in the second series of time allocations, wherein, in response to a transmission received from the first device and on the first frequency band during a current time allocation in the first series of time allocations that begins during the current time allocation in the first series of time allocations and is expected to not complete before a scheduled end of the current time allocation in the first series of time allocations, the wireless device is configured to dynamically alter a duration of the current time allocation in the first series of time allocations to complete reception of the transmission during the current time allocation in the first series of time allocations and also dynamically alter a duration of a subsequent time allocation in the second series of time allocations.

7. The wireless capable device of claim 6, wherein the first device comprises an access node and the second device comprises a client device.

8. The wireless capable device of claim 6, wherein the first time indicator corresponds to a time that is referenced with respect to a boundary between time allocations of the first series of time allocations and the second series of time allocations.

9. The wireless capable device of claim 6, wherein the wireless interface layer control circuit is also configured to control the wireless interface radio to send, to a third device communicating via the second frequency band, a second time indicator usable by the third device to select a second time to transmit that is during a selected time allocation in the second series of time allocations and does not collide with the first time to transmit selected by the second device.

10. The wireless capable device of claim 6, wherein, based on a transmission received from the second device, the wireless device is configured to alter a sleep duration of the second device.

11. The wireless capable device of claim 10, wherein, in response to the transmission received from the second device, the wireless device is configured to increase a duration of a selected time allocation by a first amount.

12. The wireless capable device of claim 11, wherein, in response to the transmission received from the second device, the wireless device is configured to decrease a time allocation that follows the selected time allocation by the first amount.

13. A method of operating a client device, comprising:
    configuring a low-latency link between the client device and a wireless interface of a computing device, the low-latency link to use a first frequency band and a first series of time allocations, the wireless interface to implement a combination of frequency division multiplexing (FDM) and time division multiplexing (TDM) to also communicate with a network access node using a second frequency band and a second series of time allocations, the first series of time allocations and the second series of time allocations to be non-overlapping;
    receiving, during a first one of the first series of time allocations and from the wireless interface and via the low-latency link, a first time indicator;
    in response to the first time indicator, configuring the client device to select a first selected transmit time that is during the first one of the first series of time allocations; and if a transmission by the client device on the first frequency band is begun at the first selected transmit time such that the transmission begins during a current time allocation in the first series of time allocations and will not complete before a scheduled end of the current time allocation in the first series of time allocations, dynamically extending the current time allocation in the first series of time allocations to allow the transmission by the client device to complete.

14. The method of claim 13, further comprising:
detecting that another device is transmitting at the first selected transmit time; and
in response to detecting that another device is transmitting at the first selected transmit time, selecting a second transmit time.

15. The method of claim 14, wherein the second transmit time is selected according to a wireless standard specified collision avoidance algorithm performed by the client device.

16. The method of claim 14, wherein the second transmit time is selected to be during the current time allocation in the first series of time allocations.

17. The method of claim 14, wherein the second transmit time is selected to be during a subsequent time allocation in the first series of time allocations.

18. The method of claim 16, wherein the first time indicator corresponds to a time that is referenced with respect to a boundary between time allocations of the first series of time allocations and the second series of time allocations.

\* \* \* \* \*